(12) United States Patent
Checkley et al.

(10) Patent No.: US 10,990,214 B2
(45) Date of Patent: Apr. 27, 2021

(54) METHODS, SYSTEMS, AND MEDIA FOR CONTROLLING PLAYBACK OF VIDEO USING A TOUCHSCREEN

(71) Applicant: Google LLC, Mountain View, CA (US)

(72) Inventors: Garen Checkley, San Francisco, CA (US); Bryce Gibson Reid, San Francisco, CA (US)

(73) Assignee: Google LLC, Mountain View, CA (US)

( * ) Notice: Subject to any disclaimer, the term of this patent is extended or adjusted under 35 U.S.C. 154(b) by 946 days.

(21) Appl. No.: 14/743,013

(22) Filed: Jun. 18, 2015

(65) Prior Publication Data

US 2015/0370402 A1    Dec. 24, 2015

Related U.S. Application Data

(60) Provisional application No. 62/014,089, filed on Jun. 18, 2014.

(51) Int. Cl.
*G06F 3/041*    (2006.01)
*H04N 21/432*    (2011.01)
(Continued)

(52) U.S. Cl.
CPC .......... *G06F 3/0416* (2013.01); *G06F 3/0412* (2013.01); *G06F 3/0484* (2013.01);
(Continued)

(58) Field of Classification Search
CPC .... G06F 3/017; G06F 3/04883; G06F 3/0488; G06F 3/048; G06F 3/0484
See application file for complete search history.

(56) References Cited

U.S. PATENT DOCUMENTS 6,415,326 B1    7/2002 Gupta et al.
2008/0084400 A1*    4/2008 Rosenberg ............ G06F 1/1626
    345/173
(Continued)

FOREIGN PATENT DOCUMENTS

CN    1967440    5/2007
CN    102566892    7/2012
(Continued)

OTHER PUBLICATIONS

Office Action dated May 16, 2018 in EP Patent Application No. 15736088.4.
(Continued)

*Primary Examiner* — Sang H Kim
(74) *Attorney, Agent, or Firm* — Byrne Poh LLP

(57) ABSTRACT

Methods, systems and media for controlling playback of video using a touchscreen are provided. In some embodiments, the method comprises: causing video content to be presented in a player window of a screen of a touchscreen; detecting a first tap gesture within the player window; causing presentation of the video content to be paused; detecting a second tap gesture via the touchscreen; causing presentation of the video content to continue; detecting a left to right swipe gesture; causing a first portion of the video content that is later in time to be presented; detecting a right to left swipe gesture; causing a second portion of the video content that is earlier in time the video content that is currently being presented to be presented.

20 Claims, 13 Drawing Sheets

(51) Int. Cl.
  *G06F 3/0487* (2013.01)
  *G06F 3/0488* (2013.01)
  *G06F 3/0484* (2013.01)
  *H04N 21/414* (2011.01)
  *H04N 21/472* (2011.01)
  *H04N 21/81* (2011.01)
  *G11B 27/10* (2006.01)
  *G11B 27/34* (2006.01)

(52) U.S. Cl.
  CPC ........ *G06F 3/0487* (2013.01); *G06F 3/04847* (2013.01); *G06F 3/04883* (2013.01); *G11B 27/105* (2013.01); *G11B 27/34* (2013.01); *H04N 21/41407* (2013.01); *H04N 21/4325* (2013.01); *H04N 21/47217* (2013.01); *H04N 21/8153* (2013.01); *G06F 2203/04808* (2013.01)

(56) References Cited

U.S. PATENT DOCUMENTS

| | | | |
|---|---|---|---|
| 2009/0199119 A1* | 8/2009 | Park | G06F 3/04847 715/765 |
| 2011/0010626 A1* | 1/2011 | Fino | G06F 3/04883 715/727 |
| 2012/0079386 A1* | 3/2012 | Kim | G06F 3/0485 715/720 |
| 2012/0166950 A1 | 6/2012 | Frumar et al. | |
| 2012/0179967 A1* | 7/2012 | Hayes | G06F 3/0484 715/719 |
| 2012/0204106 A1 | 8/2012 | Hill et al. | |
| 2013/0298021 A1* | 11/2013 | Park | G06F 3/04847 715/716 |
| 2013/0307792 A1* | 11/2013 | Andres | G11B 27/005 345/173 |
| 2013/0311928 A1* | 11/2013 | Park | G06F 3/04847 715/772 |
| 2014/0109012 A1* | 4/2014 | Choudhary | G06F 3/0483 715/838 |
| 2014/0178047 A1* | 6/2014 | Apodaca | G06F 3/041 386/248 |
| 2015/0177903 A1* | 6/2015 | Kim | G06F 3/03545 345/156 |

FOREIGN PATENT DOCUMENTS

| | | | | |
|---|---|---|---|---|
| CN | 102609143 | 7/2012 | | |
| CN | 103064596 | 4/2013 | | |
| CN | 103076985 | 5/2013 | | |
| CN | 103116467 | 5/2013 | | |
| CN | 103282869 | 9/2013 | | |
| CN | 103294347 | 9/2013 | | |
| CN | 103329075 | 9/2013 | | |
| KR | 20070094055 A | * | 9/2007 | ......... H04N 21/8549 |
| WO | WO-2006063960 A1 | * | 6/2006 | ......... G06F 3/04883 |
| WO | WO-2008085747 A2 | * | 7/2008 | ......... G06F 3/04883 |
| WO | WO 2012094479 | | 7/2012 | |
| WO | WO2013164351 | | 11/2013 | |

OTHER PUBLICATIONS

Office Action dated Aug. 29, 2018 in KR Patent Application No. 10-2016-7036773.

Office Action dated May 3, 2019 in KR Patent Application No. 10-2016-7036773.

Office Action dated Feb. 25, 2019 in CN Patent Application No. 201580032922.3.

Examination Report dated Mar. 3, 2020 in AU Patent Application No. 2015276995.

Examination Report dated Jul. 8, 2020 in AU Patent Application No. 2015276995.

Examination Report dated Dec. 9, 2019 in GB Patent Application No. 1622088.1.

Notice of Grant dated Feb. 24, 2020 in CN Patent Application No. 201580032922.3.

Office Action dated Aug. 30, 2019 in CN Patent Application No. 201580032922.3.

International Preliminary Report on Patentability and Written Opinion of the International Searching Authority dated Dec. 29, 2016 in International Patent Application No. PCT/US2015/036516.

International Search Report of the International Search Authority dated Sep. 4, 2015 in International Patent Application No. PCT/US2015/036516.

Examination Report dated Mar. 18, 2021 in IN Patent Application No. 201647041495.

* cited by examiner

US 10,990,214 B2

METHODS, SYSTEMS, AND MEDIA FOR CONTROLLING PLAYBACK OF VIDEO USING A TOUCHSCREEN

CROSS-REFERENCE TO RELATED APPLICATIONS

This application claims the benefit of U.S. Provisional Patent Application No. 62/014,089, filed Jun. 18, 2014, which is hereby incorporated by reference herein in its entirety.

TECHNICAL FIELD

The disclosed subject matter relates to methods, systems, and media for controlling playback of video using a touchscreen.

BACKGROUND

Devices having touchscreens are often used to watch videos, but the controls for navigating a video on a touchscreen are often more suitable to a device having a pointing device, such as a mouse, that allows for more precise control of what is being selected. For example, to navigate to a particular point in a video, some user interfaces for touchscreens include a progress/scrubber bar with a selectable indicator showing a current portion of the video being presented. The indicator can be dragged to a particular location along the scrubber/progress bar to select a particular portion of the video to navigate to and present. However, this requires touching a particular location on the touchscreen corresponding to the indicator in the user interface and precisely dragging the indicator to the intended portion of the scrubber/progress bar. As another example, fast forward, play/pause, and rewind functions are typically selected by touching an icon representing fast forward or rewind, which can require first causing these icons to be presented, and then requires selecting a particular portion of the user interface which is not always convenient when using a device having a touchscreen.

Accordingly, new methods, systems, and media for controlling playback of video using a touchscreen are desirable.

SUMMARY

In accordance with some embodiments of the disclosed subject matter, mechanisms for controlling playback of video using a touchscreen are provided.

In accordance with some embodiments, a method for controlling presentation of video presented on a mobile device is provided, the method comprising: causing video content to be presented in a player window of a screen of a touchscreen, wherein the player window has a length and a width; detecting a first tap gesture via the touchscreen within the player window; causing presentation of the video content to be paused in response to receiving the first tap gesture; detecting a second tap gesture via the touchscreen within the player window; causing presentation of the video content to continue from a paused state in response to detecting the second tap gesture; detecting a first swipe gesture via the touchscreen that at least begins within the player window, wherein the first swipe gesture is a swipe from left to right; in response to detecting the first swipe gesture, causing presentation of the video content to skip forward to a later time in the video content; detecting a second swipe gesture via the touchscreen that at least begins within the player window, wherein the second swipe gesture is a swipe from right to left; and in response to detecting the second swipe gesture, causing presentation of the video content to skip backward to an earlier time in the video content.

In accordance with some embodiments of the disclosed subject matter, a system for controlling presentation of video presented on a mobile device is provided, the system comprising: a hardware processor that is programmed to: cause video content to be presented in a player window of a screen of a touchscreen, wherein the player window has a length and a width; detect a first tap gesture via the touchscreen within the player window; cause presentation of the video content to be paused in response to receiving the first tap gesture; detect a second tap gesture via the touchscreen within the player window; cause presentation of the video content to continue from a paused state in response to detecting the second tap gesture; detect a first swipe gesture via the touchscreen that at least begins within the player window, wherein the first swipe gesture is a swipe from left to right; in response to detecting the first swipe gesture, cause presentation of the video content to skip forward to a later time in the video content; detect a second swipe gesture via the touchscreen that at least begins within the player window, wherein the second swipe gesture is a swipe from right to left; and in response to detecting the second swipe gesture, cause presentation of the video content to skip backward to an earlier time in the video content.

In accordance with some embodiments of the disclosed subject matter, a non-transitory computer readable medium containing computer executable instructions that, when executed by a processor, cause the processor to perform a method for controlling presentation of video presented on a mobile device is provided, the method comprising: causing video content to be presented in a player window of a screen of a touchscreen, wherein the player window has a length and a width; detecting a first tap gesture via the touchscreen within the player window; causing presentation of the video content to be paused in response to receiving the first tap gesture; detecting a second tap gesture via the touchscreen within the player window; causing presentation of the video content to continue from a paused state in response to detecting the second tap gesture; detecting a first swipe gesture via the touchscreen that at least begins within the player window, wherein the first swipe gesture is a swipe from left to right; in response to detecting the first swipe gesture, causing presentation of the video content to skip forward to a later time in the video content; detecting a second swipe gesture via the touchscreen that at least begins within the player window, wherein the second swipe gesture is a swipe from right to left; and in response to detecting the second swipe gesture, causing presentation of the video content to skip backward to an earlier time in the video content.

In accordance with some embodiments, a system for controlling presentation of video presented on a mobile device is provided, the system comprising: means for causing video content to be presented in a player window of a screen of a touchscreen, wherein the player window has a length and a width; means for detecting a first tap gesture via the touchscreen within the player window; means for causing presentation of the video content to be paused in response to receiving the first tap gesture; means for detecting a second tap gesture via the touchscreen within the player window; means for causing presentation of the video content to continue from a paused state in response to detecting the second tap gesture; means for detecting a first swipe gesture via the touchscreen that at least begins within the player window, wherein the first swipe gesture is a swipe from left to right; means for in response to detecting the first swipe gesture, causing presentation of the video content to skip forward to a later time in the video content; means for detecting a second swipe gesture via the touchscreen that at least begins within the player window, wherein the second swipe gesture is a swipe from right to left; and means, responsive to the means for detecting the second swipe gesture, for causing presentation of the video content to skip backward to an earlier time in the video content.

In some embodiments, the system further comprises: means for detecting a press and hold gesture via the touchscreen; means for receiving subsequent input via the touchscreen in connection with detecting the press and hold gesture; and means for causing a particular time in the video content to be presented based on the subsequent input and the detection of the press and hold gesture.

In some embodiments, the press and hold gesture is detected at a first point along the width of the player window, and the subsequent input includes at least a movement of the press and hold gesture to a second point along the width of the player window without being released, and the system further comprises: means for mapping times within the video content to the width of the player window; means for determining that the press and hold gesture has moved to a second point along the width of the player window without being released; means, responsive to determining that the press and hold gesture has moved to the second point, for causing the particular time in the video content corresponding to the second point to be presented based on the mapping of video content to the width of the player window; means for determining that the press and hold gesture has been released at the second point along the width of the player window; and means, responsive to determining that the press and hold gesture has been released at the second point, for causing presentation of the video content to continue from the particular time.

In some embodiments, the press and hold gesture is detected at a first point along the width of the player window, and the subsequent input includes at least a movement of the press and hold gesture to a second point along the width of the player window without being released, and the system further comprises: means for mapping navigation speeds to different portions of the player window based on the first point, wherein points to the right of the first point along the width of the player window correspond to navigation forward through the video at a first plurality of speeds and points to the left of the first point along the width of the player window correspond to navigation backward through the video at a second plurality of speeds; means for determining that the press and hold gesture has moved to a second point along the width of the player window without being released; means, responsive to determining that the press and hold gesture has moved to the second point, for causing a navigation action to be performed in a particular direction through the video content at a particular speed based on the mapping of navigation speeds to the width of the player window and the location of the second point along the width of the player window; means for determining that the press and hold gesture has been released; and means, responsive to determining that the press and hold gesture has been released, for causing presentation of the video content to continue from a third portion of the video that was navigated to at least in part based on the navigation action being performed.

In some embodiments, the system further comprises: means for causing a plurality of thumbnails to be presented in response to detecting the press and hold gesture, wherein each of the plurality of thumbnails represents video data at a time in the video; means for detecting a third tap gesture via the touchscreen within the player window, wherein the third tap gesture corresponds to one of the plurality of thumbnails; and means for causing presentation of the video content to continue from a time in the video corresponding to the particular time in the video represented by the selected thumbnail in response to detecting the third tap gesture corresponding to the one of the plurality of thumbnails.

In some embodiments, the method further comprises: detecting a third swipe gesture via the touchscreen that at least begins within the player window during presentation of the plurality of thumbnails; causing a second plurality of thumbnails to be presented in response to detecting the third swipe gesture, wherein each of the second plurality of thumbnails represents video data at a time in the video and wherein at least one of the second plurality thumbnails represents a time in the video data not represented by at any of the first plurality of thumbnails; and detecting the third tap gesture via the touchscreen within the player window during presentation of the second plurality of thumbnails, wherein the third tap gesture corresponds to one of the second plurality of thumbnails.

In some embodiments, the player window occupies the full screen of the touchscreen.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, mechanisms (which can include methods, systems and media) for controlling playback of video using a touchscreen are provided.

In some embodiments, these mechanisms can allow a user to control playback and navigation of video content using touch gestures that can be accepted at a non-specific location within a player window being used to present the video content. In some embodiments, an application or a web browser being executed by a computing device having a touchscreen (e.g., a smartphone, a tablet computer, an all-in-one computer, a desktop computer having a touchscreen, a laptop having a touchscreen, etc.) can present a video in a player window corresponding to at least a portion of a screen of the computing device. Although touchscreens are generally described herein as being used to detect input, any suitable device or techniques can be used to detect input, such as a touchpad, a trackball, a joystick, an analog stick, a mouse, any other suitable device and/or techniques, and/or any suitable combination thereof.

In some embodiments, if, during presentation of the video, the mechanisms described herein detect a tap gesture within the player window and/or receive an indication such that a tap gesture has been received, the mechanisms can cause a play/pause state of the video to be toggled such that if the video is being player then playback can be paused and vice versa.

In some embodiments, if, during presentation of the video, the mechanisms described herein detect a swipe gesture at least starting within the player window and/or receive an indication that such a swipe gesture has been received, the mechanisms can cause presentation of the video to skip a predetermined amount forward or backward in the video based on the direction of the swipe.

In some embodiments, if, during presentation of the video, the mechanisms described herein detect a press and hold gesture within the player window and/or receive an indication that such a press and hold gesture has been received, the mechanisms can navigate to a portion of the video in accordance with inputs received subsequent to the press and hold gesture.

Figure 1:
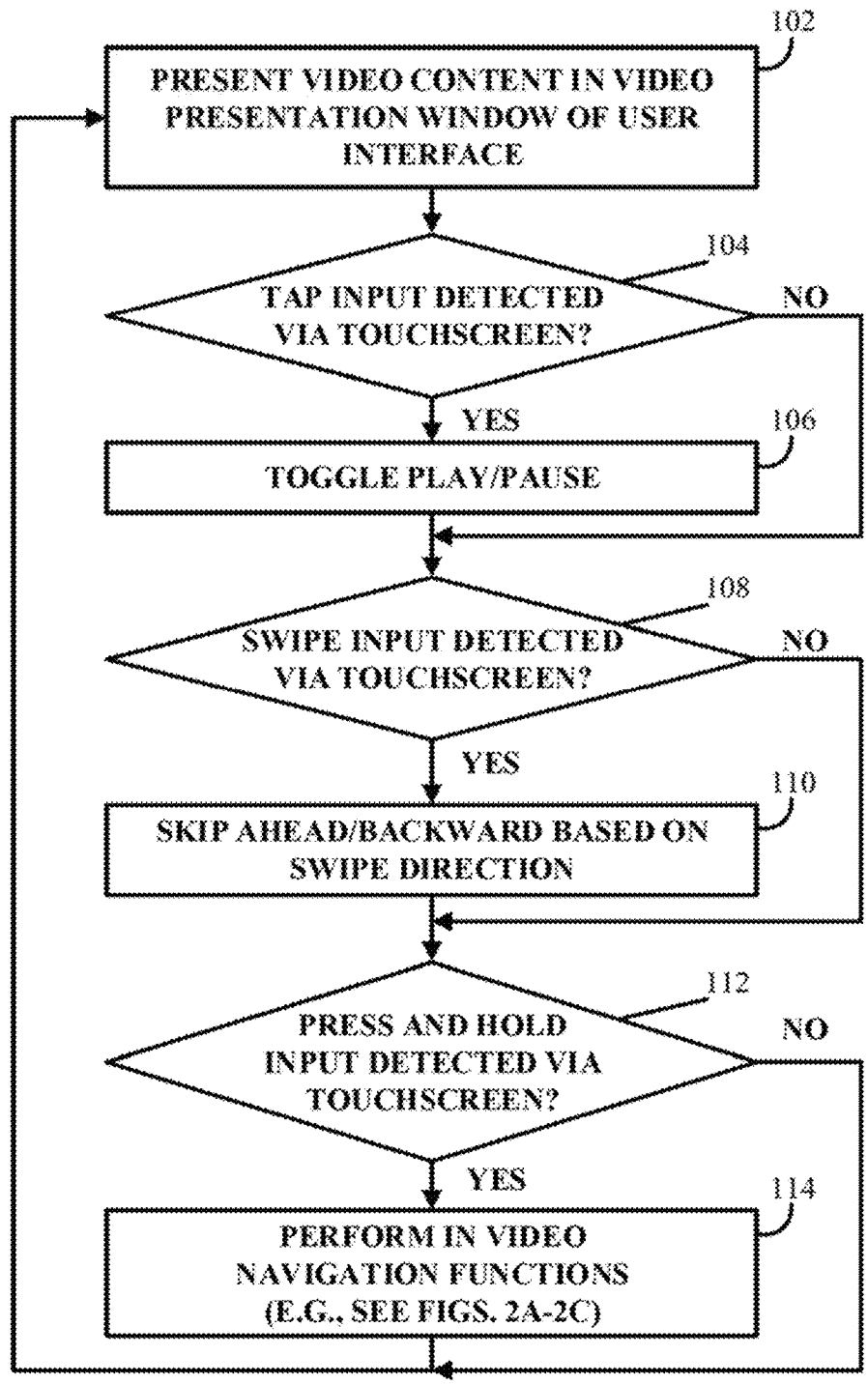
FIG. 1 shows an example of a process for controlling playback of video using a touchscreen in accordance with some embodiments of the disclosed subject matter.

FIG. 1 shows an example 100 of a process for controlling playback of video using a touchscreen in accordance with some embodiments of the disclosed subject matter.

As shown in FIG. 1, process 100 can begin, at 102, by presenting video content in a video presentation portion of a user interface. The video presentation portion can be any suitable portion of a user interface that is used for presenting video data of a video that is being presented (note that the video can also include other data, such as audio data, metadata, links, annotations, etc., that may or may not be presented by the video presentation portion). For example, the video presentation portion can be a video player window of a web page, a player window of an application for discovering and/or presenting videos from a particular source or sources, a player window of an application for presenting video from any source of a particular format or particular formats (e.g., a plug-in), and/or any other suitable portion of a user interface. The portion of a user interface used to present a video is generally referred to herein as a player window. Note that this language is used as an example and is not intended to limit the portions of user interfaces for presenting user interfaces with which the mechanisms described herein can be used. In some embodiments, the player window can include a full screen of a device that is being used to present the video.

At 104, process 100 can determine whether a tap input is detected within the player window via a touchscreen of a device executing process 100 (e.g., as described below in connection with FIG. 8). A tap can include any suitable touch detected by the touchscreen for less than a predetermined period of time and/or with less than a predetermined amount of movement from an initial point of contact. Process 100 can use any suitable period of time to differentiate between a tap and another type of gesture, such as a press and hold. For example, contact for less than five hundred milliseconds, less than 750 milliseconds, less than one second, and/or any other suitable period of time, can be interpreted as a tap. Process 100 can use any suitable distance threshold for determining that a gesture is a tap instead of a swipe. For example, if the distance that a point of contact travels between initial contact and release is less than or equal to a threshold distance in any direction, process 100 can interpret the gesture as a tap (if the time of the contact is also below the threshold period of time).

In some embodiments, a device executing process 100 can detect and/or interpret gestures (e.g., whether a particular contact is a tap, a press and hold, a swipe, etc.) and make such detected gestures available to process 100. For example, when a particular gesture is input into a touchscreen of a device executing process 100, the device can determine that the gesture is a tap and determine the coordinates of the tap, and this information can be relayed to process 100 which can determine an action to take based on the gesture and/or coordinates.

If process 100 determines that a tap input has been detected at the touchscreen at a point within the player window ("YES" at 104), process 100 can proceed to 106. At 106, process 100 can cause presentation of the video to be paused if the video is currently in a play state or played if the video is currently in a paused state.

Figure 3A:
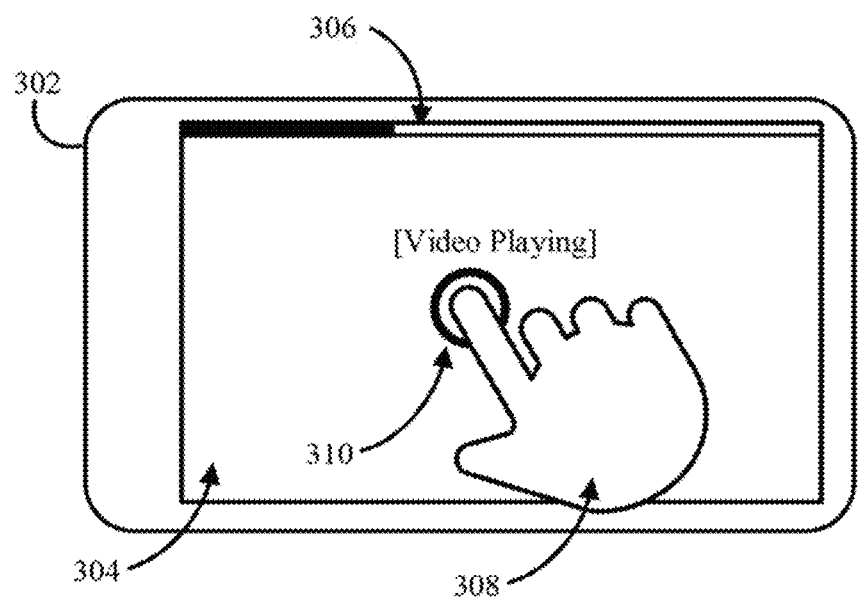
FIGS. 3A and 3B show an example of a mobile device presenting a video using a screen of a touchscreen during and after user interaction to pause presentation of the video in accordance with some embodiments of the disclosed subject matter.

FIG. 3A shows an example of a mobile device 302 presenting a video using a screen 304 of a touchscreen in accordance with some embodiments of the disclosed subject matter. In some embodiments, during presentation of the video by mobile device 302, a progress bar 306 can show a current time of the video that is being presented by showing a bar that fills progress bar 306 as the video is presented. In the example of FIG. 3A, a user, represented by hand 308 is performing a tap gesture, illustrated as empty circle 310. As shown in FIG. 3A, an entire screen area of mobile device 302 is being used as the player window, but this is merely an example and any suitable portion of screen 304 can be used to present the video.

Figure 3B:
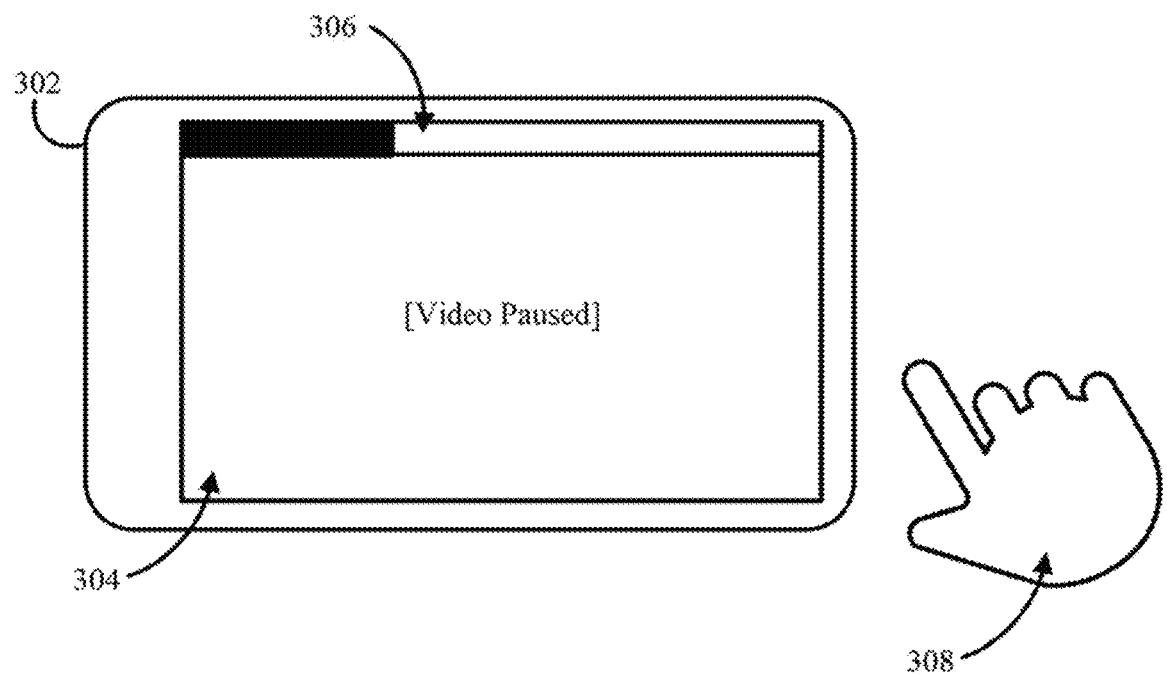

FIG. 3B shows an example of a mobile device 302 after process 100 detects the tap within the player window (e.g., anywhere within screen 304 in this example) in accordance with some embodiments of the disclosed subject matter. As shown, progress bar 306 can be presented at a larger size in response to detecting a tap (and/or any other suitable gesture) such that a user can more easily perceive current time information. In some embodiments, other controls and/or information can be exposed in response to an input, such as tap 310 being detected, such as volume controls, navigation controls (e.g., to switch between full screen and non-full screen, to go back, etc.), and/or any other suitable controls. In some embodiments, in lieu of or in addition to presenting progress bar 306 at a larger size, any other suitable user interface element can be presented to mark the progress of the video, such as a thumbnail representing a current scene along progress bar 306 at a position corresponding to a current time.

Returning to FIG. 1, at 104, if a tap is not detected ("NO" at 104), process 100 can proceed to 108. At 108, process 100 can determine whether a swipe gesture is detected within (and/or at least starting within) the video presentation portion via a touchscreen of a device executing process 100. A swipe can include any suitable touch detected by the touchscreen for less than a predetermined period of time and/or with greater than or equal to a threshold amount of movement from an initial point of contact. Process 100 can use any suitable period of time to differentiate between a swipe and another type of gesture, such as a press and hold and movement in a particular direction. For example, contact for less than five hundred milliseconds, less than 750 milliseconds, less than one second, and/or any other suitable period of time, can be interpreted as a swipe if the amount of movement is greater than or equal to a threshold amount. In some embodiments, process 100 can use any suitable distance threshold for determining that a gesture is a swipe instead of a tap. For example, if the distance that a point of contact travels between initial contact and release is greater than or equal to a threshold distance in any direction, process 100 can interpret the gesture as a swipe (if the time of the contact is also below the threshold period of time).

As discussed above in connection with 104, in some embodiments, a device executing process 100 can detect and/or interpret gestures (e.g., whether a particular contact is a tap, a press and hold, a swipe, etc.) and make such detected gestures available to process 100.

If process 100 determines that a swipe input has been detected at the touchscreen at least starting at a point within the portion of the player window ("YES" at 108), process 100 can proceed to 110.

At 110, process 100 can cause presentation of the video to skip forward or back by a predetermined amount of time. In some embodiments, process 100 can respond to a swipe from left to right detected at 108 by causing presentation of the video to skip forward (e.g., fast forward) a predetermined amount. Similarly, in some embodiments, process 100 can respond to a swipe from right to left detected at 108 by causing presentation of the video to skip backward (e.g., rewind) a predetermined amount (which can be the same or different than the amount by which a rightward swipe causes presentation to skip ahead).

In some embodiments, the amount of time by which presentation is skipped forward and/or backward by process 100 in response to a swipe can be a fixed amount of time (e.g., five seconds, ten seconds, etc.). Alternatively, in some embodiments, the amount of time by which presentation is skipped forward or backward by process 100 in response to a swipe can be a variable amount of time based on one or more factors. For example, the amount by which presentation is skipped forward or backward can depend on the length of the swipe (e.g., a longer swipe can cause a longer skip). As another example, the amount by which presentation is skipped forward or backward can depend on how much video is remaining and/or has been presented. In such an example, the amount by which presentation is skipped forward can be longer when more of the video remains to be presented from a current time and shorter when less of the video remains to be presented from the current time. In a more particular example, if there are five minutes remaining to be presented from a current time, process 100 can cause the video to skip ahead by ten seconds in response to a swipe, but if there are only thirty seconds remaining, process 100 can cause the video to skip ahead by five seconds in response to a swipe. As yet another example, the amount by which presentation is skipped forward or backward can be proportional to how much video is remaining and/or has been presented. In such an example, process 100 can cause the video to skip ahead by a predetermined fraction of the total length of the video or by a predetermined fraction of the amount of the video remaining to be presented/that has been presented (e.g., based on whether the swipe was to skip forward or backward, respectively).

Figure 4A:
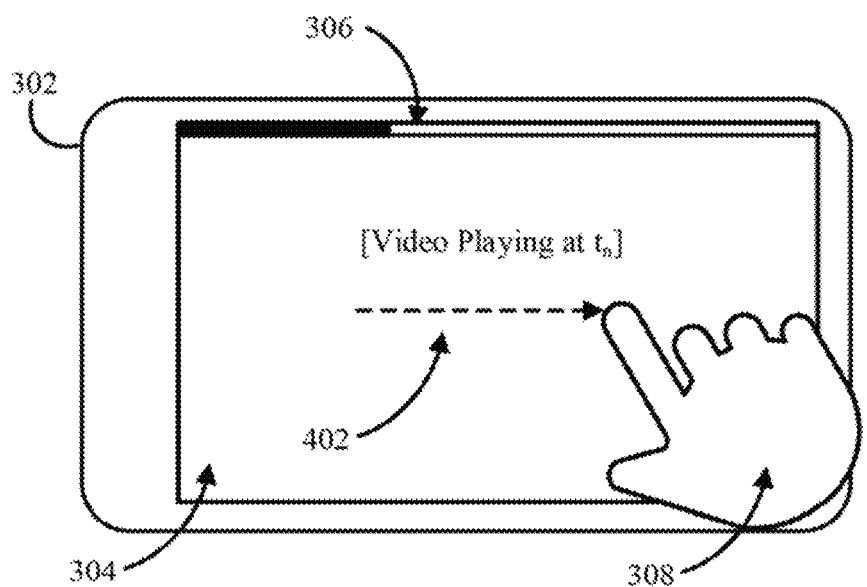
FIGS. 4A and 4B show an example of a mobile device presenting a video using a screen of a touchscreen during and after user input for navigating the video is detected in accordance with some embodiments of the disclosed embodiments.
Figure 4B:
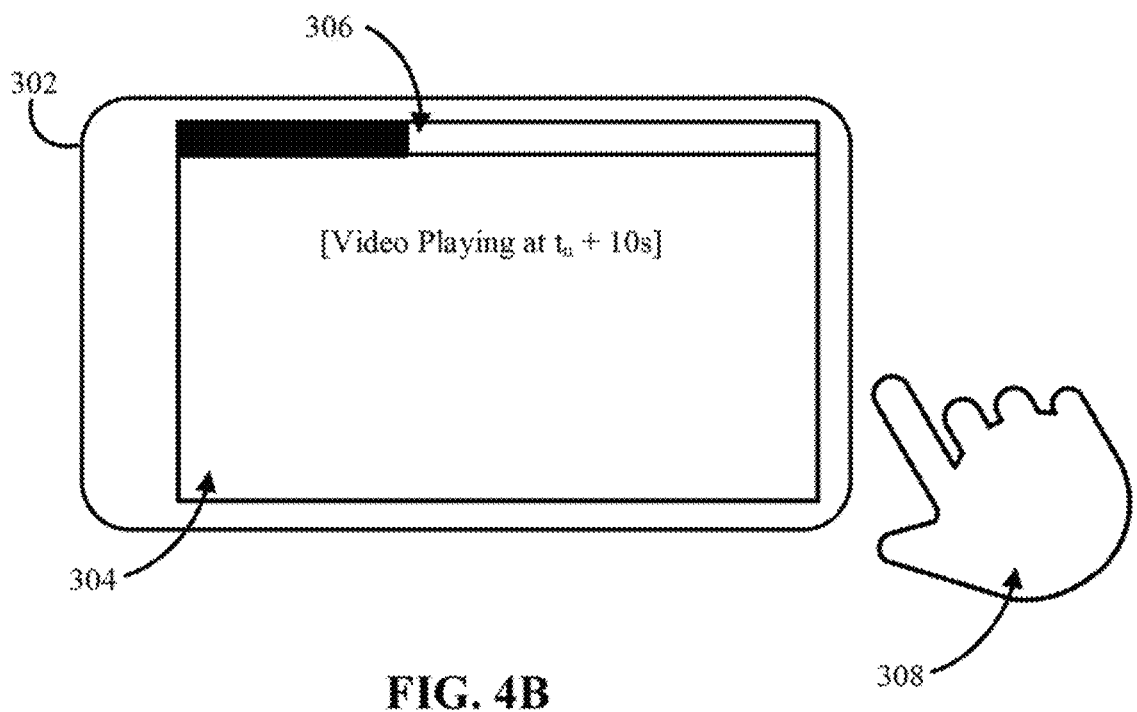

FIG. 4A shows an example of mobile device 302 presenting the video using screen 304 when a swipe, illustrated as broken line 402, is detected in accordance with some embodiments of the disclosed embodiments. As shown in the example of FIG. 4A, a current time in the video when the swipe is received is represented by time $t_n$, and is also represented as a proportion of the total time of the video by progress bar 306. FIG. 4B shows an example of mobile device 302 after process 100 detects swipe 402 from left to right within the player window in accordance with some embodiments of the disclosed embodiments. As shown, process 100 causes presentation of the video to skip ahead by ten seconds in response to the swipe (e.g., as described above in connection with 110) to time $t_n$ plus 10 seconds. Note that a height of a swipe (e.g., up or down in FIGS. 4A-4B) may or may not have an effect on the amount of time that is skipped based on the swipe.

Returning to FIG. 1, at 108, if a swipe is not detected ("NO" at 108), process 100 can proceed to 112. At 112, process 100 can determine whether a press and hold gesture is detected within the player window via a touchscreen of a device executing process 100. A press and hold can include any suitable touch detected by the touchscreen for greater than a predetermined period of time and/or with less than or equal to a predetermined amount of movement from an initial point of contact. Process 100 can use any suitable period of time to differentiate between a press and hold and another type of gesture, such as a tap and/or swipe. For example, contact for greater than five hundred milliseconds, greater than 750 milliseconds, greater than one second, and/or any other suitable period of time, can be interpreted as a press and hold if the amount of movement is less than or equal to a threshold amount. Process 100 can use any suitable distance threshold for determining that a gesture is a press and hold. For example, if the distance that a point of contact travels between initial contact and a point of contact after the threshold period of time has elapsed is less than the threshold distance, process 100 can interpret the gesture as a press and hold.

As discussed above in connection with 104 and 108, in some embodiments, a device executing process 100 can detect and/or interpret gestures (e.g., whether a particular contact is a tap, a press and hold, a swipe, etc.) and make such detected gestures available to process 100.

If process 100 determines that a press and hold input has been detected at the touchscreen in the portion of the user interface for presenting video ("YES" at 112), process 100 can proceed to 114. At 114, process 100 can perform one or more functions for navigating to a particular and/or arbitrary time within the video (e.g., as opposed to skipping ahead or backward by a particular amount). Examples of such navigation functions are shown in, and described below in connection with, FIGS. 2A-2C, 5A-5B, 6A-6C and 7A-7C.

Otherwise, if a press and hold is not detected ("NO" at 112), process 100 can return to 102 and continue presenting video.

Figure 2A:
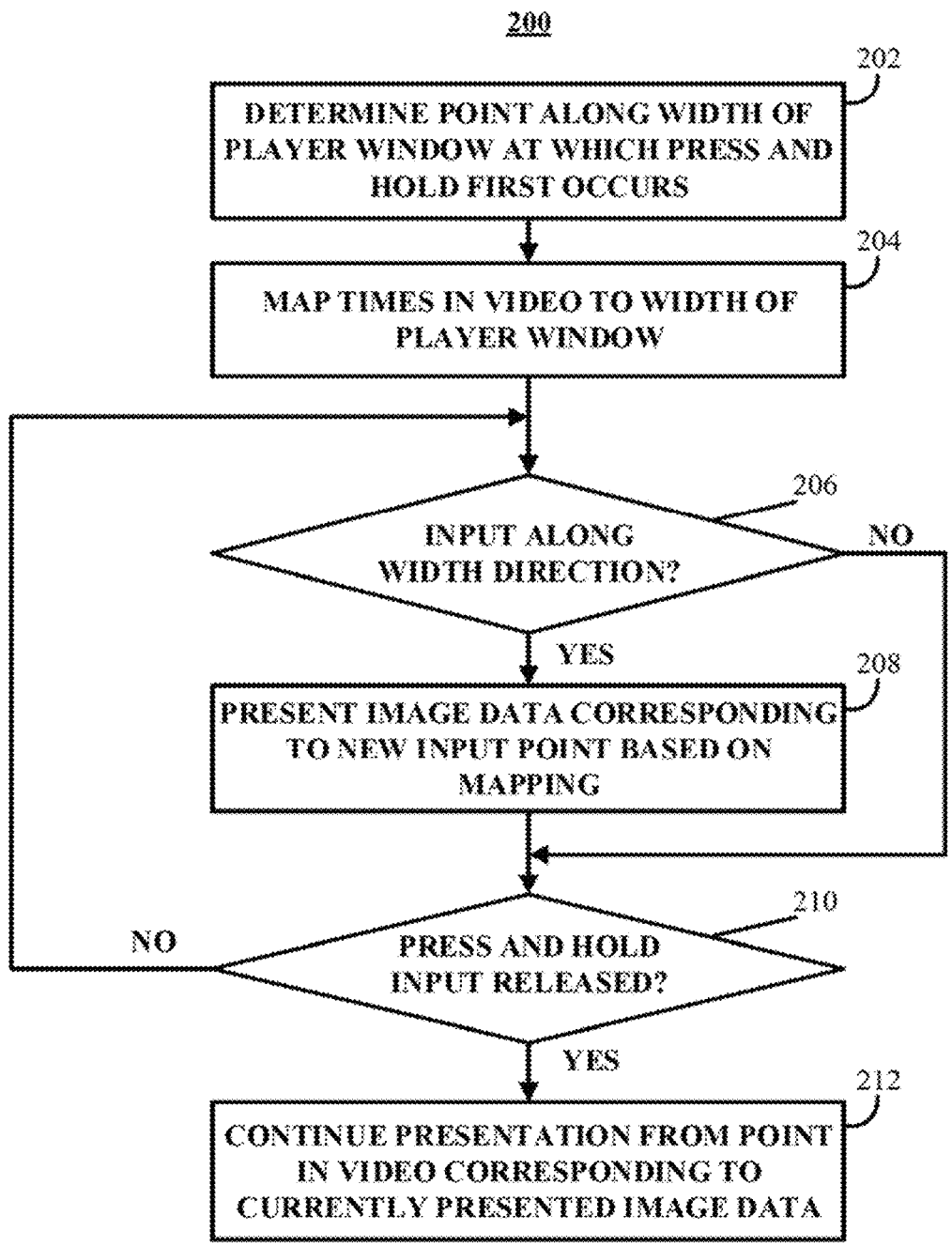
FIGS. 2A-2C show examples of processes for navigating to a particular portion of a video that is being presented based on movement from an initiation point of a press and hold gesture in accordance with some embodiments of the disclosed subject matter.

FIG. 2A shows an example 200 of a process for navigating to a particular portion of a video that is being presented based on movement from an initiation point of a press and hold gesture in accordance with some embodiments of the disclosed subject matter. As shown in FIG. 2A, process 200 can begin at 202 by determining a point along the width of the player window at which a press and hold gesture (e.g., detected at 112) first occurs. Any suitable technique or combination of technique can be used to determine such a point. For example, a coordinate representing the point along the width of the player window can be determined based on where the press and hold was initially detected (e.g., a point of initial contact and/or a point of contact when the duration of contact passed a threshold period for determining that a press and hold is detected). The coordinate can then be compared to the size and/or coordinates of the player window to determine a proportion of the width that is in front of the initial point (e.g., to the left of the coordinate and within the portion for presenting the video) and a portion that is behind of the initial point (e.g., to the left of the coordinate and within the portion for presenting the video). Note that the width as discussed herein can be based on the way in which the video is being presented such that the width can be the short side of the portion for presenting the video when a video is being presented as a portrait video and the long side of the portion for presenting the video when a video is being presented as a landscape video. Note also that the long side of the portion for presenting the video does not necessarily coincide with a long side of the screen being used to present the video (e.g., if the portion is smaller than full sized and is presented landscape when the screen is oriented in a portrait fashion). In some embodiments, a side along which width is measured can correspond to a side along which a progress bar is presented.

At 204, process 200 can map times in the video being presented to a width of the player window. In some embodiments, such mapping can be performed using any suitable technique or combination of techniques and can be performed in any suitable manner. For example, the portion of the player window that is to the right of the initial point of contact can be mapped to points in the video that are forward in time from a current time, and the portion of the player window that is to the left of the initial point of contact can be mapped to points in the video that are backward in time from a current time.

In some embodiments, process 200 can perform mapping such that a beginning of the video corresponds to the left side of the player window, the initial point of contact corresponds to a time of the video when the press and hold was detected, and the end of the video corresponds to the right side of the player window. In such embodiments, times before and after the time when the press and hold was detected can be mapped at different scales. For example, if the press and hold is initiated near the left side of the player window, the times prior to the current time can be assigned less space for mapping and times after the current time can be assigned more space. This can, for example, allow for more fine grained navigation in a particular direction in time within the video by starting navigation near an edge.

At 206, process 200 can determine whether movement of the press and hold gesture along the width direction of the player window is detected after the press and hold is detected. If movement along the width direction is detected ("YES" at 206), process 200 can proceed to 208. At 208, process 200 can cause image data corresponding to a new input point along the width of the player window to be presented based on the mapping performed at 204. For example, if each pixel of movement to the right is mapped to two seconds of movement forward in time through the video that is being presented and a movement to the right of ten pixels is detected by process 200 (and/or any other suitable process), process 200 can cause image data corresponding to a time that is twenty seconds forward from the time at which the press and hold was detected to be presented. In some embodiments, such presentation can occur using the entire player window or a portion of the player window (e.g., by presenting a thumbnail). Additionally, in some embodiments, presentation of the video can be paused or otherwise inhibited during such a navigation operation as described in connection with process 200 (e.g., if the entire player window is used to present the image data). Alternatively, in some embodiments, presentation of the video can be continued from the point at which the press and hold was detected during such a navigation operation as described in connection with process 200 (e.g., if thumbnails are used to present the image data).

Otherwise, if input is not detected ("NO" at 206), process 200 can proceed to 210. At 210, process 200 can determine whether the press and hold gesture is released. If the press and hold gesture is released ("YES" at 210), process 200 can proceed to 212 and cause presentation of the video to be continued from a point in the video corresponding to the image data that is currently being presented after any navigation in response to detection at 206.

Otherwise, if the press and hold gesture is not released ("NO" at 210), process 200 can return to 206 and continue to determine if movement is detected.

In some embodiments, process 200 can cancel navigation (e.g., navigate back to a point in the video corresponding to the point in the video when the press and hold gesture was initially detected) in response to any suitable detection. For example, process 200 can cancel navigation in response to detecting movement to a portion of the touchscreen that does not correspond to the player window. As another example, process 200 can cancel navigation in response to detecting movement off the touch screen while contact is maintained (e.g., when the player window corresponds to the full screen, etc.). As yet another example, process 200 can cancel navigation in response to detecting a particular gesture not detected as a valid input for navigation in process 200, such as a particular gesture from a particular bezel toward a center of the touchscreen, a particular multitouch gesture, any other suitable gesture, or any suitable combination thereof.

Figure 5A:
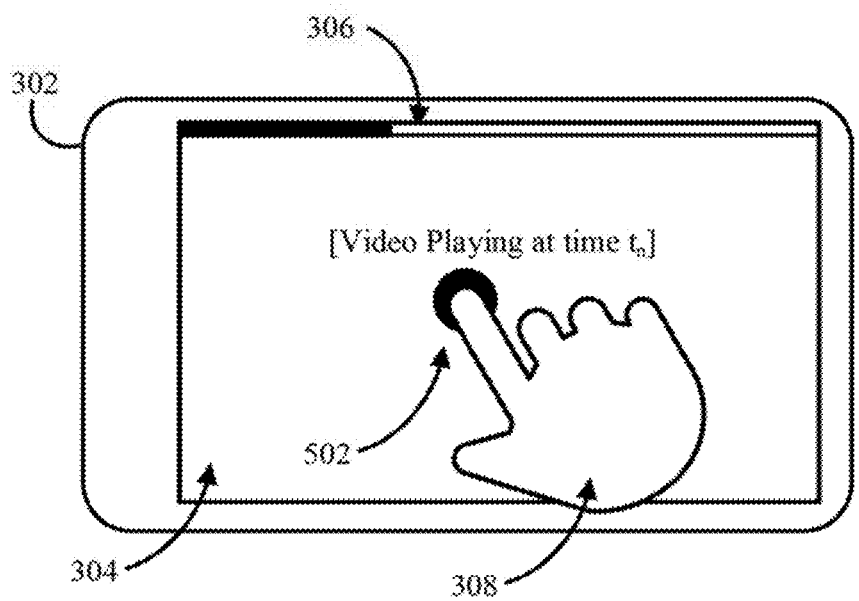
FIGS. 5A and 5B show an example of a mobile device presenting a video using a screen of a touchscreen during and after user input, including a press and hold gesture, for navigating the video is detected in accordance with some embodiments of the disclosed embodiments.
Figure 5B:
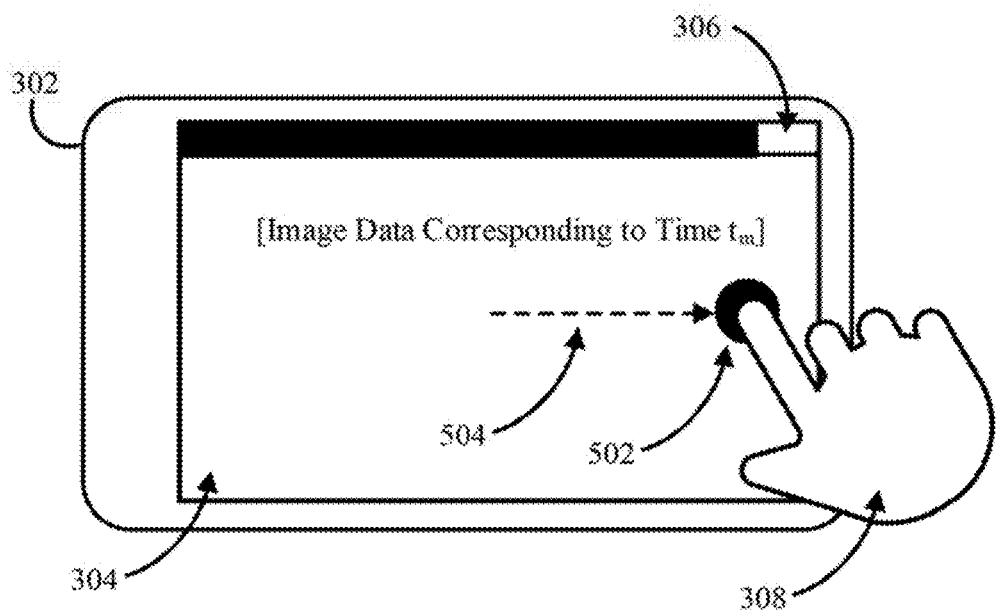

FIG. 5A shows an example of mobile device 302 presenting the video using screen 304 when a press and hold gesture illustrated as filled-in circle 502 is detected in accordance with some embodiments. As shown in the example of FIG. 5A, a current time, $t_n$, in the video when the press and hold is received can be represented on progress bar 306 (and/or using any other suitable technique or techniques for representing the current time). FIG. 5B shows an example of mobile device 302 after processes 100 and/or 200 detect press and hold 502 and a movement to the right illustrated as broken line 504 in accordance with some embodiments. As shown, process 200 causes image data corresponding to time $t_m$ in the video represented by progress bar 306 shown in FIG. 5B to be presented. If the user were to release press and hold 502 without further movement from the position shown in FIG. 5B, process 200 can cause presentation of the video to be continued from time $t_m$. Note that movement in the height direction (e.g., up and down in FIGS. 5A-5B) may or may not have an effect on the point in the video to which process 200 navigates.

Figure 2B:
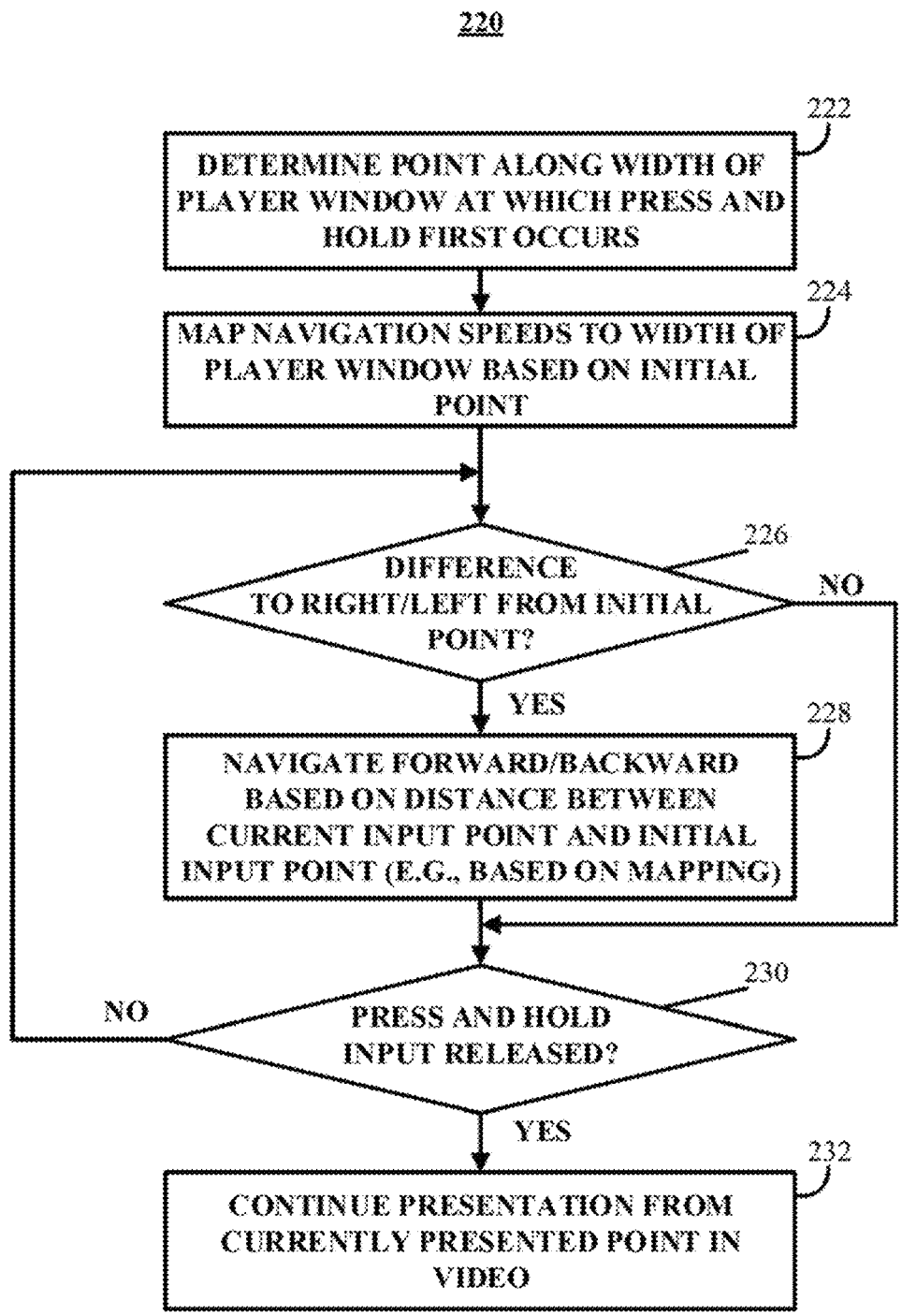

FIG. 2B shows an example 220 of a process for navigating through portions of a video that is being presented based on movement from an initiation point of a press and hold gesture in accordance with some embodiments of the disclosed subject matter. As shown in FIG. 2B, process 220 can begin at 222 by determining a point along the width of the player window at which a press and hold gesture (e.g., detected at 112) first is detected. In some embodiments, 222 can be similar to 202 described above in connection with FIG. 2A.

At 224, process 220 can map navigation speeds to a width of the player window. In some embodiments, such mapping can be performed using any suitable technique or combination of techniques and can be performed in any suitable manner. For example, the portion of the player window to the right of the initial point of contact can be mapped to fast forward navigation for moving forward in time, and the portion of the player window that is to the left of the initial point of contact can be mapped rewind navigation for moving backward in time. In some embodiments, the speed of navigation corresponding to various points along the width of the player window can increase with distance from the initial point of contact such that a portion close to the right edge can represent a faster fast forward speed than a portion just to the right of the initial point of contact. In some embodiments, mapping of the navigation speeds can be discrete such that an area of the player window corresponds to a particular speed, and a neighboring area corresponds to another speed, etc. Additionally or alternatively, mapping of the navigation speeds can be continuous such that the speed increases with distance from the initial point of contact in certain portions of the player window, and may or may not change by discrete amounts at certain points.

At 226, process 220 can determine whether there is a difference to along the width direction of the player window to the left or right between the initial point and a current point of the player window. If a difference along the width direction is detected ("YES" at 226), process 220 can proceed to 228. At 228, process 220 can navigate through the video data at a speed based on the distance between the initial point of content and the current point of contact (e.g., based on the mapping at 224).

Otherwise, if input is not detected ("NO" at 226), process 220 can proceed to 230. At 230, process 220 can determine whether the press and hold gesture is released. If the press and hold gesture is released ("YES" at 230), process 220 can proceed to 232 and cause presentation of the video to be continued from a current point in the video that was navigated to using movements to the left and/or right from the initial point of contact to fast forward and/or rewind. Otherwise, if the press and hold gesture is not released ("NO" at 230), process 220 can return to 226 and continue to determine if movement is detected.

In some embodiments, process 220 can cancel navigation (e.g., navigate back to a point in the video corresponding to the point in the video when the press and hold gesture was initially detected) in response to any suitable detection. For example, process 220 can cancel navigation in response to detecting movement to a portion of the touchscreen that does not correspond to the player window. As another example, process 220 can cancel navigation in response to detecting movement off the touch screen while contact is maintained (e.g., when the player window corresponds to the full screen, etc.). As yet another example, process 220 can cancel navigation in response to detecting a particular gesture not detected as a valid input for navigation in process 220, such as a particular gesture from a particular bezel toward a center of the touchscreen, a particular multitouch gesture, any other suitable gesture, or any suitable combination thereof.

Figure 6A:
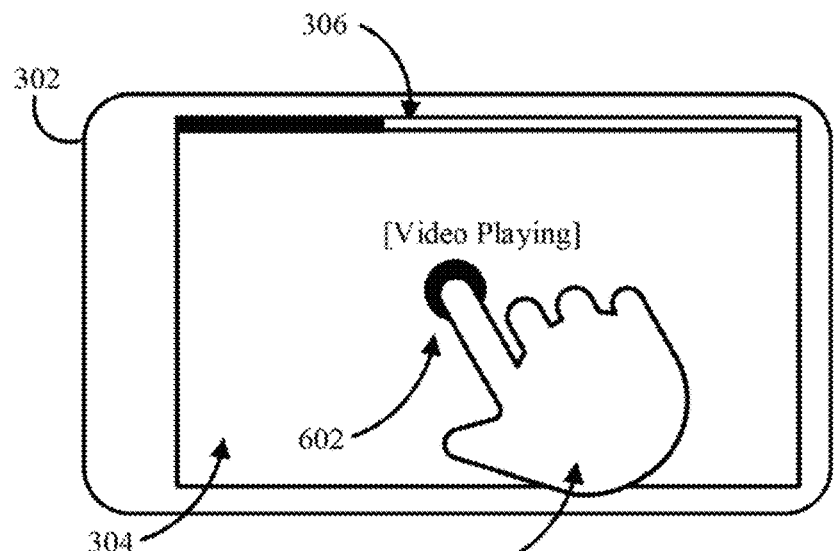
FIGS. 6A-6C show another example of a mobile device presenting a video using a screen of a touchscreen during and after user input, including a press and hold gesture, for navigating the video is detected in accordance with some embodiments of the disclosed embodiments.
Figure 6B:
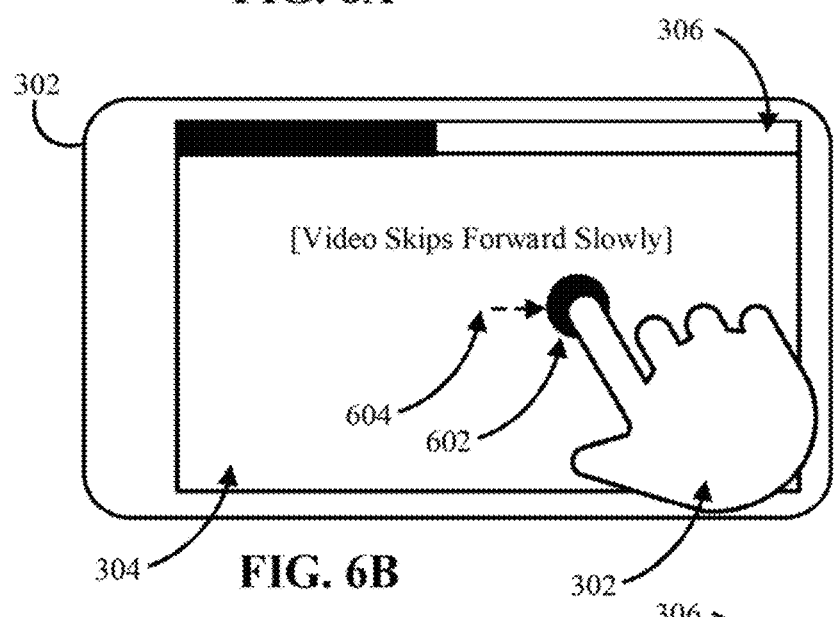
Figure 6C:
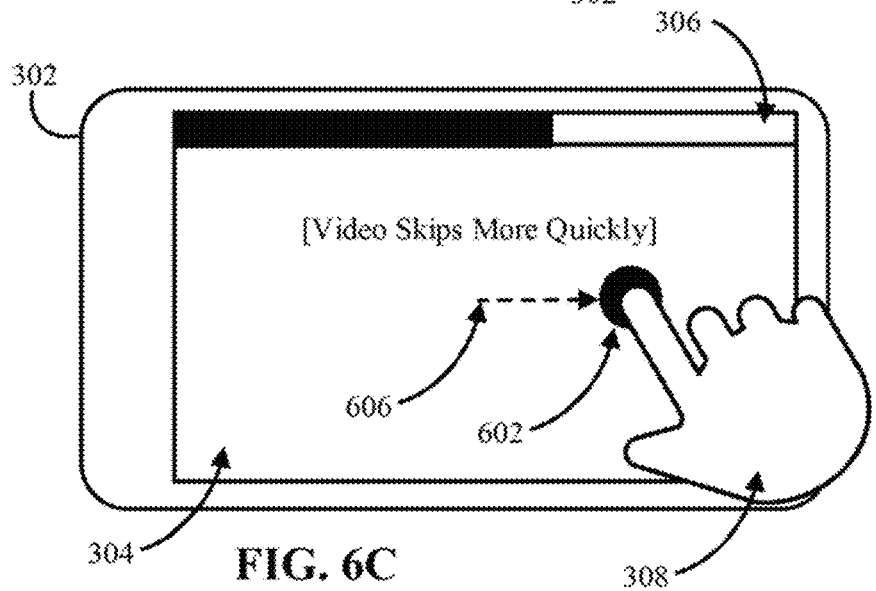

FIG. 6A shows an example of mobile device 302 presenting the video using screen 304 when a press and hold gesture illustrated as filled-in circle 602 is detected in accordance with some embodiments of the disclosed subject matter. As shown in the example of FIG. 6A, a current time in the video when the press and hold is received can be represented by progress bar 306 (and/or using any other suitable technique or techniques for representing the current time). FIG. 6B shows an example of mobile device 302 after processes 100 and/or 220 detect press and hold 602 and a movement to the right illustrated as broken line 604 in accordance with some embodiments of the disclosed subject matter. As shown, process 220 can navigate forward through the video at a relatively slow speed (e.g., compared to a maximum navigation speed) based on the distance between the initial point of contact of press and hold 602 to a current location (e.g., represented by a length and direction of broken line 604). FIG. 6C shows an example of mobile device 302 after processes 100 and/or 220 detect press and hold 602 and movement further to the right illustrated as broken line 606 (which is longer than broken line 604) in accordance with some embodiments of the disclosed subject matter. As shown, process 220 can navigate forward through the video at a relatively faster speed (e.g., compared the speed of FIG. 6B) based on the distance between the initial point of contact of press and hold 602 to a current location (e.g., represented by a length and direction of broken line 606). Note that movement in the height direction (e.g., up and down in FIGS. 6A-6C) may or may not have an effect on the navigation speed.

Figure 2C:
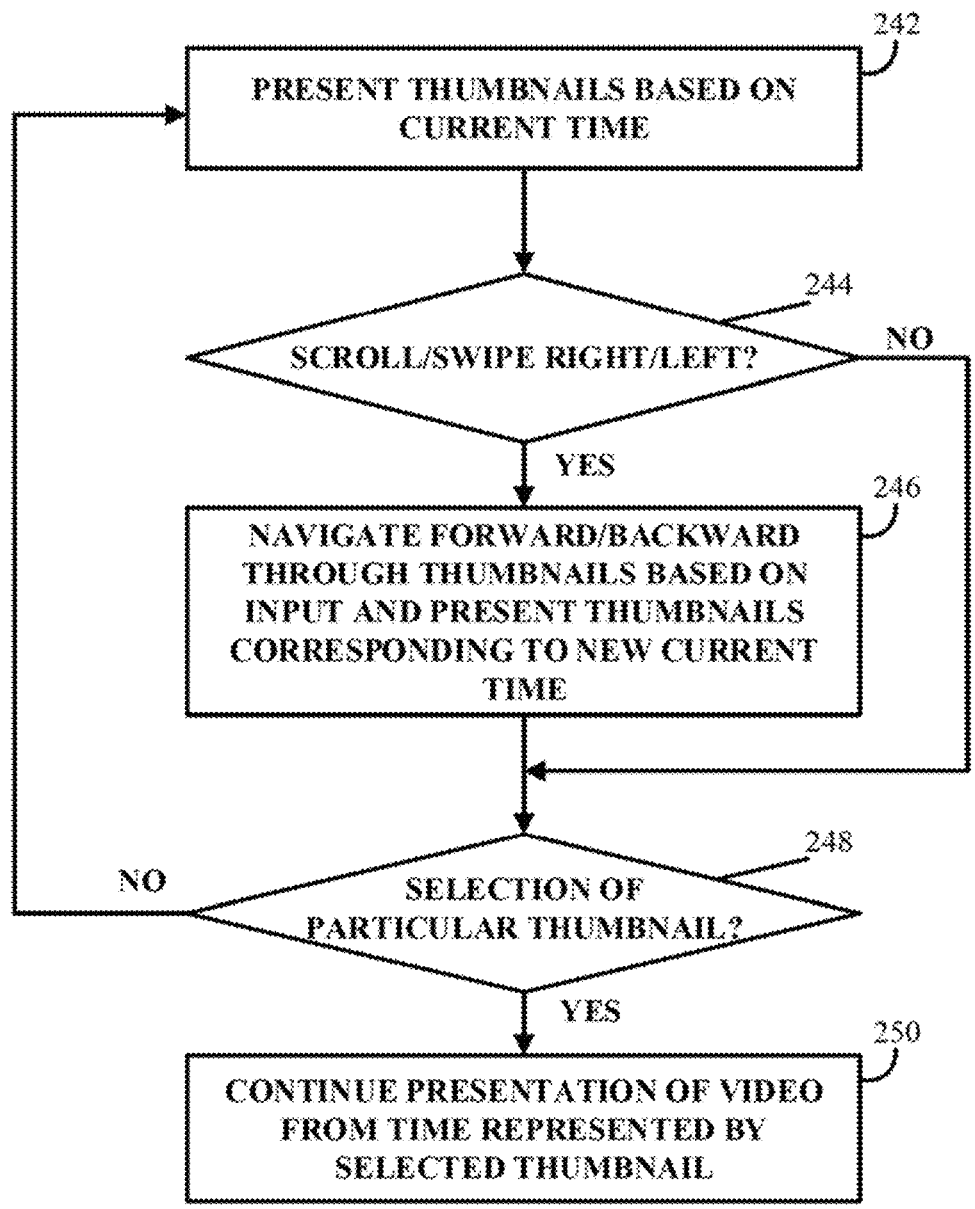

FIG. 2C shows an example 240 of a process for navigating to a particular portion of a video that is being presented based on thumbnails representing points in the video that are presented in response to a press and hold gesture in accordance with some embodiments of the disclosed subject matter. As shown in FIG. 2C, process 240 can begin at 242 by presenting thumbnails corresponding to video data around a current time in the video when a press and hold gesture is detected (e.g., at 112). In some embodiments, a thumbnail corresponding to a time in the video being presented when the press and hold gesture was detected can be presented and one or more thumbnails corresponding to times in the video before and/or after the time in the video being presented when the press and hold gesture was detected.

In some embodiments, such thumbnails can be generated in response to the press and hold gesture being detected as described above in connection with 112 of FIG. 1. For example, such thumbnails can be extracted from the video data when the press and hold gesture is detected. Additionally or alternatively, in some embodiments, such thumbnails can be cached and/or otherwise stored prior to detection of the press and hold gesture being as described above in connection 112 of FIG. 1, and can be retrieved in response to detecting the press and hold gesture.

In some embodiments, each thumbnail can represent a particular point in the video and/or can represent a portion surrounding such a point in the video. For example, in some embodiments, one thumbnail can be associated with each second of video and such a thumbnail can be generated from a frame associated with that second of video. As another example, in some embodiments, one thumbnail can be associated with a larger portion of video, such as five seconds and/or where there is a significant change in the composition of a scene in the video (e.g., based on differences in the image data being at least a threshold difference).

At 244, process 240 can determine whether a scroll or swipe gesture is detected. In some embodiments, a scroll can be distinguished from a swipe by the amount of time contact is maintained with a touchscreen, where a scroll can be a gesture where contact is maintained for a period of time greater than a threshold period of time and a swipe can be, as described above, a gesture where contact is maintained for a period of time less than the threshold period of time. If a scroll or swipe gesture is detected ("YES" at 244), process 240 can proceed to 246. At 246, process 240 can navigate through the thumbnails based on the input and can cause thumbnails associated with a new position within the video to be presented. In some embodiments, different inputs can cause navigation through the thumbnails to be performed by different amounts. For example, in response to a scroll input to the left, process 240 can cause navigation through thumbnails corresponding to a time before a current time at a relatively slow speed corresponding to the speed of the scroll action. As another example, in response to a swipe input to the right, 240 can cause navigation through thumbnails corresponding to a time after a current time at a relatively faster speed (e.g., skipping over a predetermined number of thumbnails corresponding to times after the current time). In some embodiments, a speed of navigation can correspond to a detected speed of movement of the input such that thumbnails are navigated through more quickly when the movement used to make the input is faster.

Otherwise, if input is not detected ("NO" at 244), process 240 can proceed to 248. At 248, process 240 can determine whether a particular thumbnail being presented has been selected using any suitable input, such as a tap on the thumbnail to be selected. If a particular thumbnail has been selected ("YES" at 248), process 240 can proceed to 250 and can cause presentation of the video to be continued from a time of the corresponding to the selected thumbnail. Otherwise, if a thumbnail is not selected ("NO" at 248), process 240 can return to 242 and continue to present thumbnails associated with the current point in time (e.g., based on navigation through the thumbnails at 246).

In some embodiments, process 240 can cancel navigation (e.g., navigate back to a point in the video corresponding to the point in the video when the press and hold gesture was initially detected) in response to any suitable detection. For example, process 240 can cancel navigation in response to detecting a tap on a portion of the player window that does not correspond to a thumbnail. As another example, process 240 can cancel navigation in response to detecting a swipe in a direction orthogonal to a direction by which navigation through the thumbnails is accomplished (e.g., when the thumbnails correspond to the full player window, etc.). As yet another example, process 240 can cancel navigation in response to detecting a particular gesture not detected as a valid input for navigation in process 240, such as a particular gesture from a particular bezel toward a center of the touchscreen, a particular multitouch gesture, any other suitable gesture, or any suitable combination thereof.

Figure 7A:
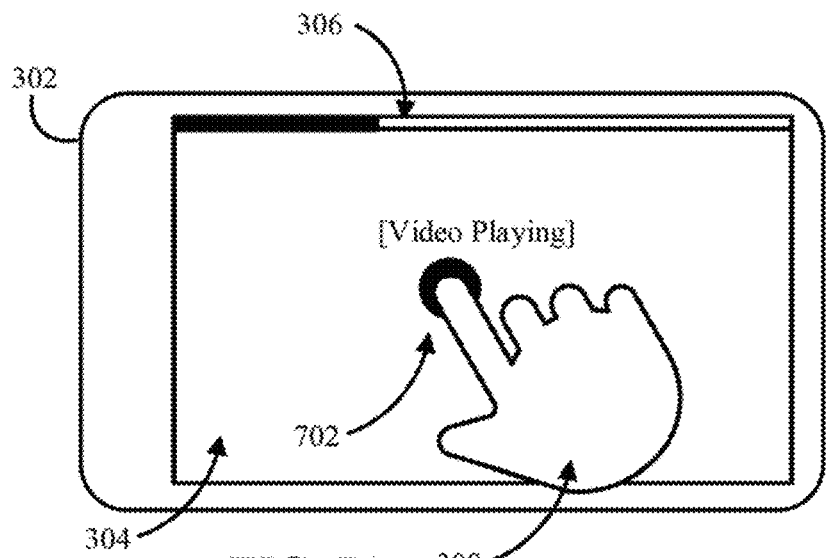
FIGS. 7A-7C show yet another example of a mobile device presenting a video using a screen of a touchscreen during and after user input, including a press and hold gesture, for navigating the video is detected in accordance with some embodiments of the disclosed embodiments.
Figure 7B:
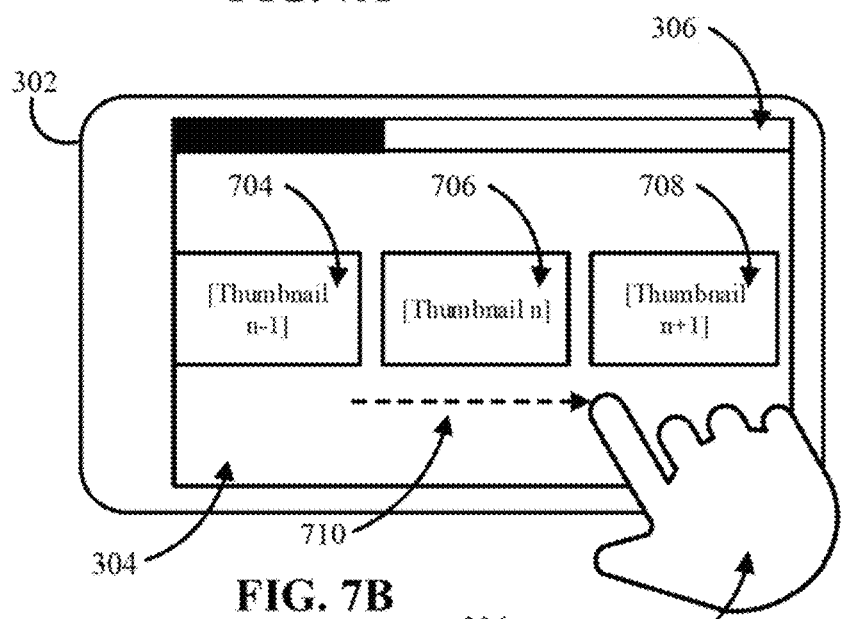

FIG. 7A shows an example of mobile device 302 presenting the video using screen 304 when a press and hold gesture illustrated as filled in circle 702 is detected in accordance with some embodiments of the disclosed subject matter. As shown in the example of FIG. 7A, a current time in the video when the press and hold is received can be represented on progress bar 306 (and/or using any other suitable technique or techniques for representing the current time). FIG. 7B shows an example of mobile device 302 after processes 100 and/or 240 detect press and hold 702. As shown, process 240 can cause thumbnails 704-708 to be presented, representing a current scene at the time press and hold 702 was initially received (e.g., as represented by thumbnail 706) and thumbnails representing times before and after the current time (e.g., as represented by thumbnails 704 and 708, respectively) in accordance with some embodiments of the disclosed subject matter. Note that although three thumbnails are shown, any suitable number of thumbnails can be presented which can be based on the size of the screen being used, a size of the player window within the screen, the resolution of the screen, the size of the thumbnails, and/or based on any other suitable factors. Also note that the size and style in which thumbnails 704-708 are presented is merely an example and thumbnails can be presented using any suitable techniques, sizes, styles, etc.

Figure 7C:
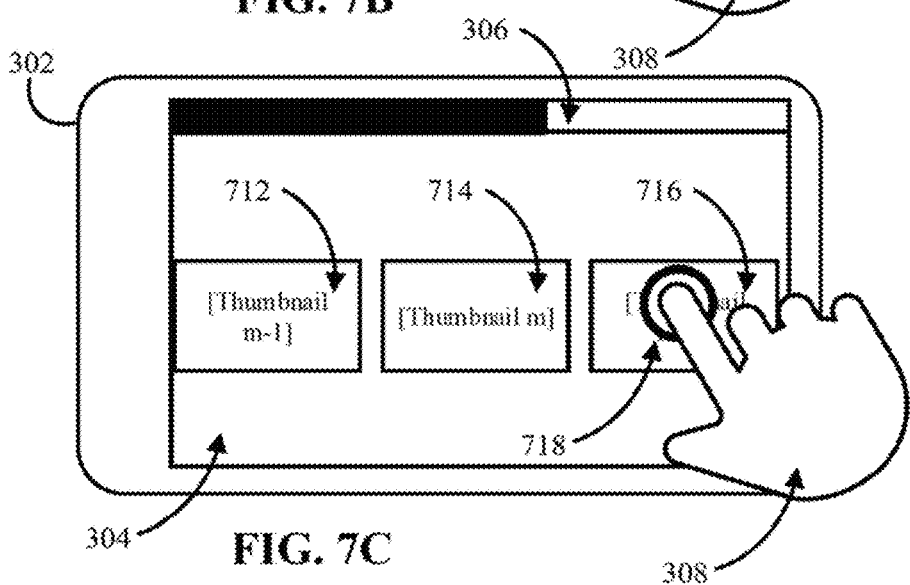

As shown in FIG. 7B, a swipe represented by broken line 710 is detected. FIG. 7C shows an example of mobile device 302 after processes 100 and/or 240 detect inputs to navigate through thumbnails, such as swipe 710 and/or any other suitable inputs in accordance with some embodiments of the disclosed subject matter. As shown, process 240 can cause thumbnails 712-716 to be presented, which can represent video at times around a time represented by progress bar 306 as shown in FIG. 7C. Process 240 can detect a tap input selecting thumbnail 716 represented by circle 718 and can, in response cause the video to be presented from a time corresponding to thumbnail 716.

Figure 8A:
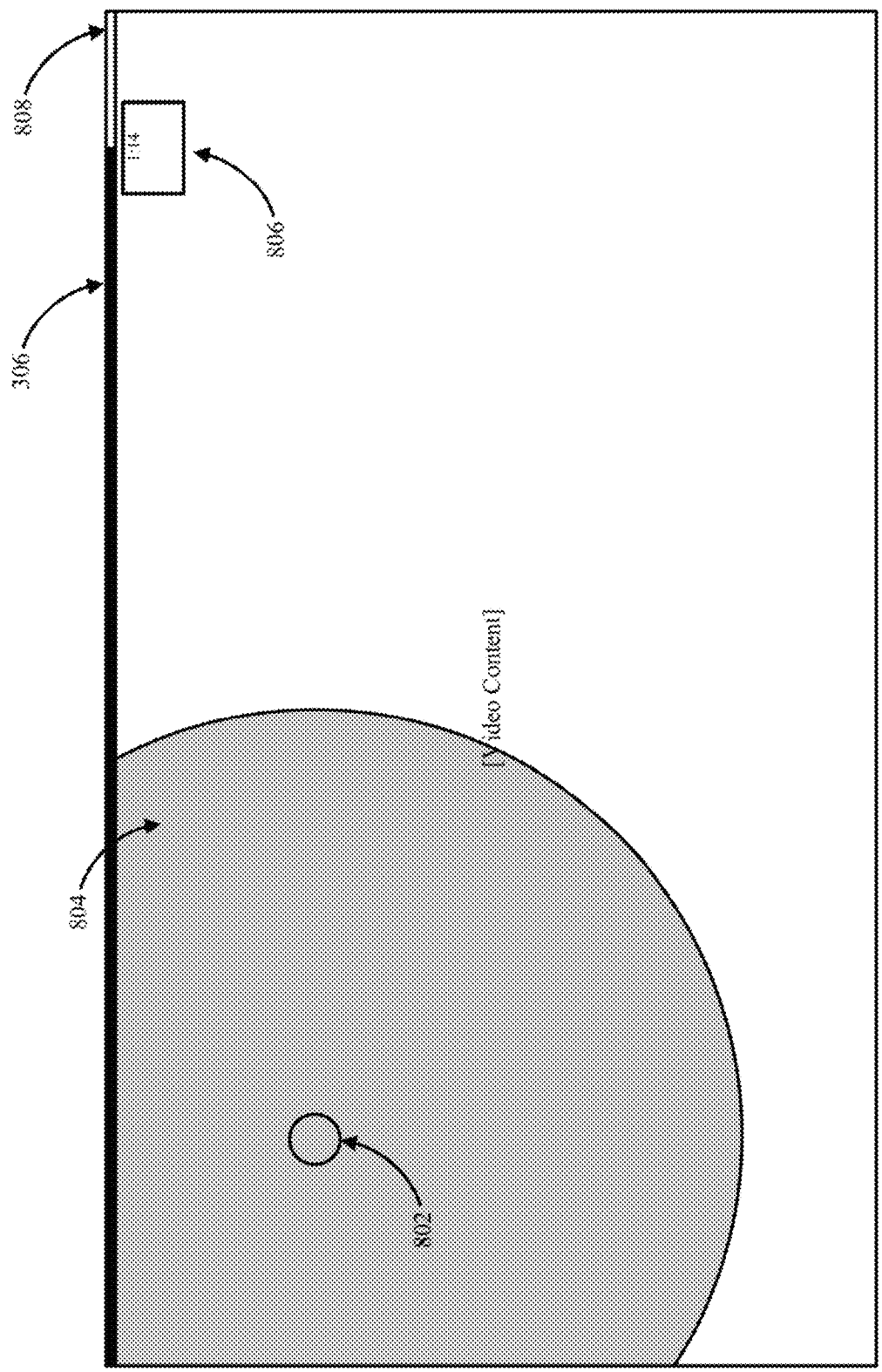
FIGS. 8A-8C show examples of a user interface that can be presented within a player window during navigation of the video in accordance with some embodiments of the disclosed subject matter.
Figure 8B:
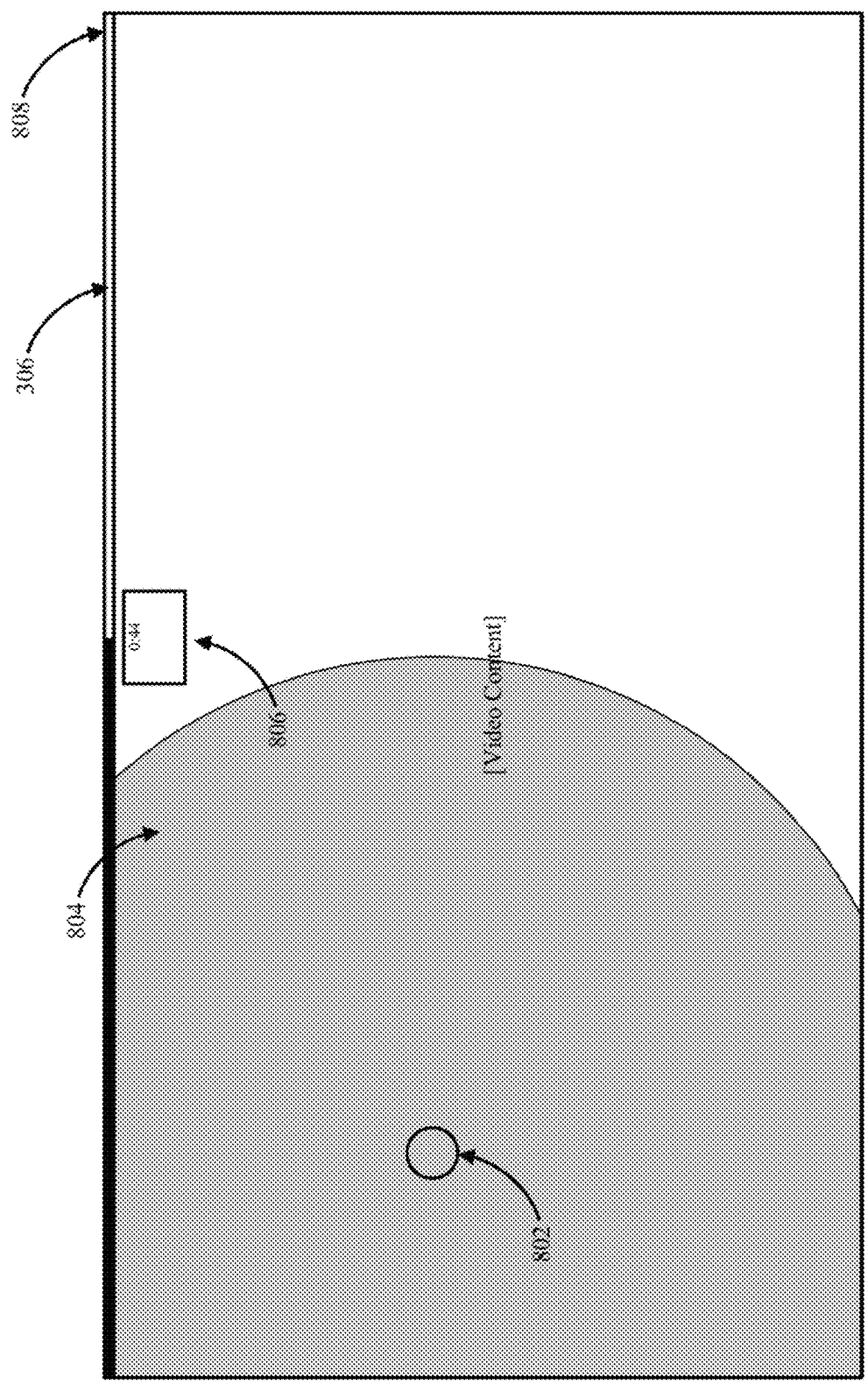
Figure 8C:
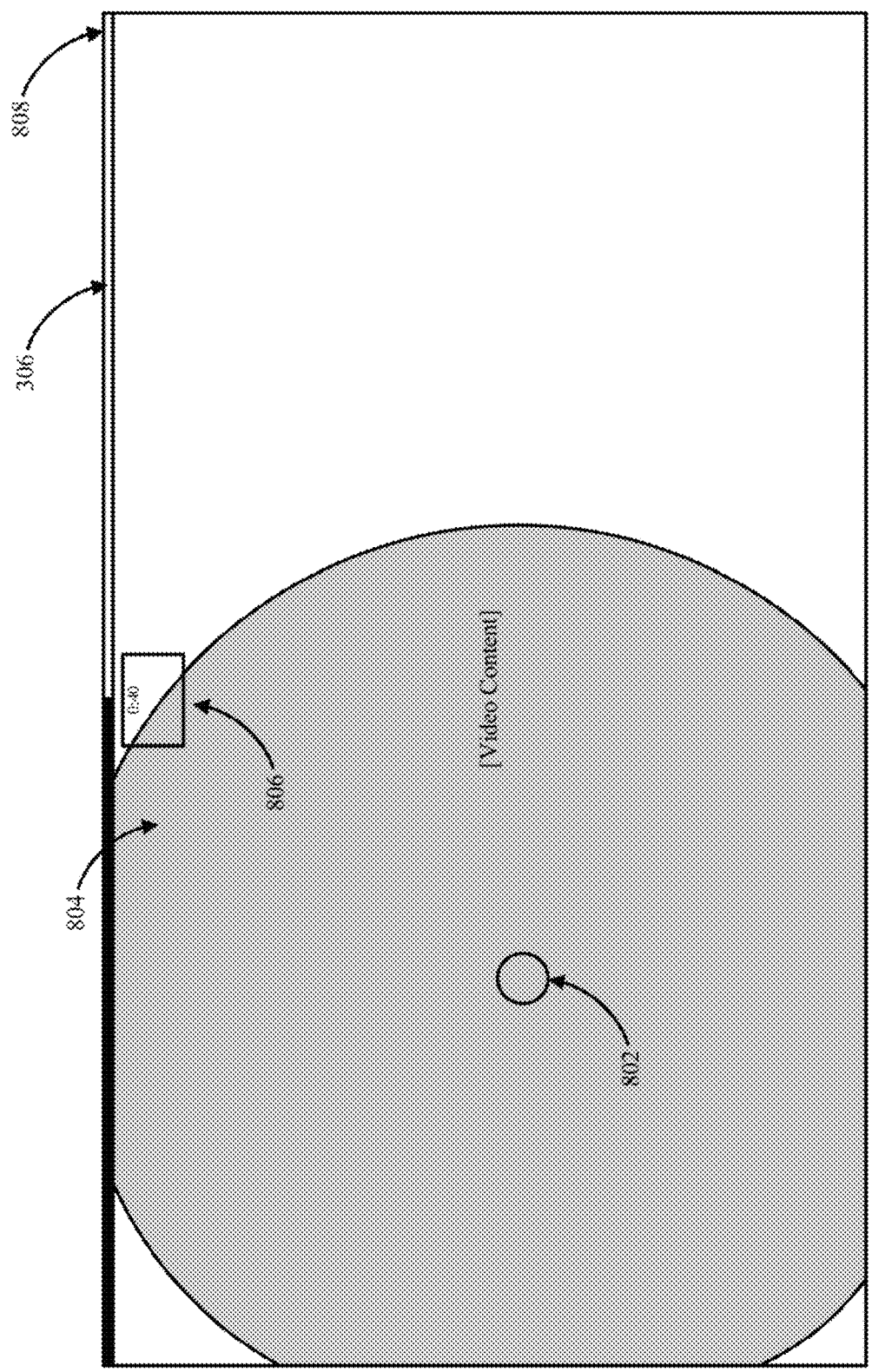

FIGS. 8A-8C show examples of a user interface that can be presented within a player window during navigation of the video in accordance with some embodiments of the disclosed subject matter. As shown in FIGS. 8A-8C, in some embodiments, a marker 802 represented as a circle can be presented in the user interface to indicate a current location within the player window at which contact is detected. Note that, in some embodiments, marker 802 can be presented using any suitable technique or combination of techniques, can be conveyed using any suitable shape, symbol, etc. In some embodiments, marker 802 can be omitted.

In some embodiments, a region 804 can be shown around a point where contact is detected and can be presented as a shaded or semi-transparent region, which can assist a user in determining where contact is being made by inferring a center of region 804 corresponding to the point at which contact is made.

In some embodiments, a thumbnail 806 can be presented adjacent to progress bar 306 at a point in time which corresponds to the image data and/or video data currently being presented by the user interface. In some embodiments, a time associated with the currently presented image data and/or video data can be presented in association with progress bar 306 and/or thumbnail 806. For example, the time in FIG. 8A is one minute fourteen seconds, the time in FIG. 8B is forty-four seconds, and the time in FIG. 8C is forty seconds. In some embodiments, a total time 808 can be presented in the user interface. For example, in FIGS. 8A-8C, total time 808 is one minute twenty-two seconds.

Figure 9:
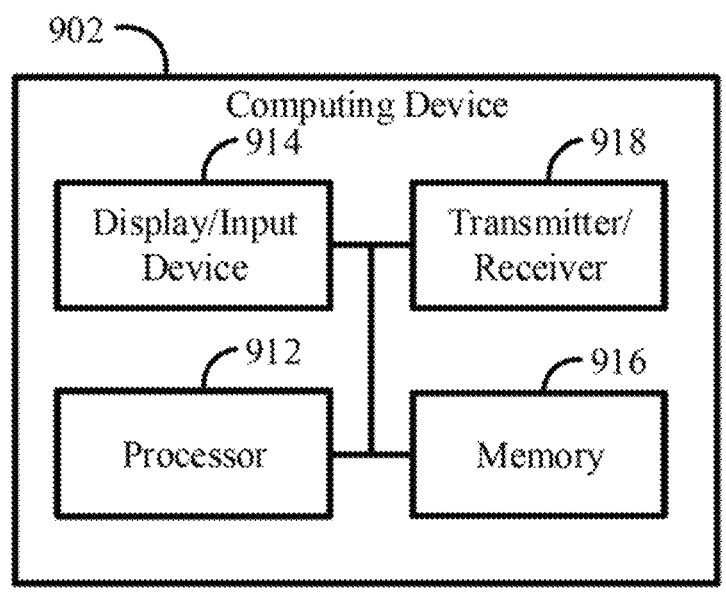
FIG. 9 shows an example of hardware that can be used to implement a computing device in accordance with some embodiments of the disclosed subject matter.

FIG. 9 shows an example 900 of hardware that can be used to implement a computing device 902 in accordance with some embodiments of the disclosed subject matter. In some embodiments, computing device 902 can include any suitable computing device such as a smartphone, a tablet computer, a wearable computer, a personal computer, a laptop computer, a gaming console, a digital media receiver, a set-top box, a smart television, a server, etc. For example, computing device 902 can be computing device 302. Referring to FIG. 9, computing device 902 can include a hardware processor 912, a display/input device 914, memory 916, and a transmitter/receiver 918, which can be interconnected. In some embodiments, memory 916 can include a storage device (such as a computer-readable medium) for storing a computer program for controlling hardware processor 912.

Hardware processor 912 can use the computer program to present on display/input device 914 a player window and/or a user interface that allows a user to, among other things, control presentation of the video by hardware processor 912, and/or perform at least a portion of one or more of processes 100, 200, 220 and 240. In some embodiments, hardware processor 912 can send and receive data through any suitable communications links using, for example, a transmitter, receiver, transmitter/receiver, transceiver, or any other suitable communication device, such as transmitter/receiver 918 to send and receive data over any suitable communications network. Such a communications network can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links can be any communications links suitable for communicating data among computing device 902 and/or any other suitable devices, such as network links, dial-up links, wireless links, hard-wired links, any other suitable communications links, or any suitable combination of such links.

Display/input device 914 can include a touchscreen, a flat panel display, a cathode ray tube display, a projector, a speaker(s), and/or any other suitable display and/or presentation devices, and can further include a touch interface of a touchscreen, a touchpad, a trackball, a joystick, an analog stick, a computer keyboard, a computer mouse, a microphone, a voice recognition circuit, and/or any other suitable input device. Transmitter/receiver 918 can include any suitable transmitter and/or receiver for transmitting and/or receiving, among other things, video content.

In some embodiments, the mechanisms described herein can include software, firmware, hardware, or any suitable combination thereof. For example, the mechanisms described herein can encompass a computer program written in a programming language recognizable by hardware processor 912 (e.g., a program written in a programming language, such as, Java, C, Objective-C, C++, C#, Javascript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 2A-2C can be executed or performed in any order or sequence not limited to the order and sequence shown and described in the figures. Also, some of the above steps of the processes of FIGS. 1 and 2A-2C can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for controlling playback of video using a touchscreen are provided.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is limited only by the claims that follow. Features of the disclosed embodiments can be combined and rearranged in various ways.

What is claimed is:

1. A method for controlling presentation of video presented on a mobile device, the method comprising:
    causing video content to be presented in a player window of a screen of a touchscreen, wherein the player window has a length and a width and wherein times within the video content are mapped to the width of the player window;
    detecting, via the touchscreen, a press and hold gesture;
    receiving a subsequent input via the touchscreen in connection with detecting the press and hold gesture;
    causing a particular time in the video content to be presented based on the subsequent input and the detection of the press and hold gesture, wherein the press and hold gesture is detected at a first point along the width of the player window and wherein the subsequent input includes at least a movement of the press and hold gesture to a second point along the width of the player window without being released;
    mapping times within the video content to the width of the player window, wherein times before and after the press and hold gesture was detected are mapped at different scales based on the first point of the press and hold gesture, wherein the portion of the player window that is to the right of the first point of contact are mapped to points in the video content that are forward in time from a current time at a first scale based on the first point in comparison with a right side of the player window and the portion of the player window that is to the left of the first point of contact are mapped to points in the video content that are backward in time from the current time at a second scale based on the first point in comparison with a left side of the player window;

determining that the press and hold gesture has moved to the second point along the width of the player without being released;

in response to determining that the press and hold gesture has moved to the second point, causing the particular time in the video content corresponding to the second point to be presented based on the mapping of video content to the width of the player window;

determining that the press and hold gesture has been released at the second point of the player window; and in response to determining that the press and hold gesture has been released at the second point, causing presentation of the video content to continue from the particular time.

2. The method of claim 1, further comprising:

detecting a first tap gesture via the touchscreen within the player window;

causing presentation of the video content to be paused and causing a size of a progress bar that indicates playback position to be increased from a first size to a second size in response to receiving the first tap gesture;

detecting a second tap gesture via the touchscreen within the player window; and causing presentation of the video content to continue from a paused state in response to detecting the second tap gesture.

3. The method of claim 2, further comprising:

mapping navigation speeds to different portions of the player window based on the first point, wherein points to the right of the first point along the width of the player window correspond to navigation forward through the video at a first plurality of speeds and points to the left of the first point along the width of the player window correspond to navigation backward through the video at a second plurality of speeds;

determining that the press and hold gesture has moved to a second point along the width of the player window without being released;

in response to determining that the press and hold gesture has moved to the second point, causing a navigation action to be performed in a particular direction through the video content at a particular speed based on the mapping of navigation speeds to the width of the player window and the location of the second point along the width of the player window;

determining that the press and hold gesture has been released; and in response to determining that the press and hold gesture has been released, causing presentation of the video content to continue from a third portion of the video that was navigated to at least in part based on the navigation action being performed.

4. The method of claim 1, further comprising:

detecting a first swipe gesture via the touchscreen that at least begins within the player window, wherein the first swipe gesture is a swipe from left to right;

in response to detecting the first swipe gesture, causing presentation of the video content to skip forward to a later time in the video content, wherein the video content is skipped forwards by a predetermined time period;

detecting a second swipe gesture via the touchscreen that at least begins within the player window, wherein the second swipe gesture is a swipe from right to left; and in response to detecting the second swipe gesture, causing presentation of the video content to skip backward to an earlier time in the video content, wherein the video content is skipped backwards by the predetermined time period.

5. The method of claim 4, further comprising:

causing a plurality of thumbnails to be presented in response to detecting the press and hold gesture, wherein each of the plurality of thumbnails represents video data at a time in the video;

detecting a third tap gesture via the touchscreen within the player window, wherein the third tap gesture corresponds to one of the plurality of thumbnails; and causing presentation of the video content to continue from a time in the video corresponding to the particular time in the video represented by the selected thumbnail in response to detecting the third tap gesture corresponding to the one of the plurality of thumbnails.

6. The method of claim 5, further comprising:

detecting a third swipe gesture via the touchscreen that at least begins within the player window during presentation of the plurality of thumbnails;

causing a second plurality of thumbnails to be presented in response to detecting the third swipe gesture, wherein each of the second plurality of thumbnails represents video data at a time in the video and wherein at least one of the second plurality thumbnails represents a time in the video data not represented by at any of the first plurality of thumbnails; and detecting the third tap gesture via the touchscreen within the player window during presentation of the second plurality of thumbnails, wherein the third tap gesture corresponds to one of the second plurality of thumbnails.

7. The method of claim 1, wherein the player window occupies the full screen of the touchscreen.

8. A system for controlling presentation of video presented on a mobile device, the system comprising:

a hardware processor that is programmed to:

cause video content to be presented in a player window of a screen of a touchscreen, wherein the player window has a length and a width and wherein times within the video content are mapped to the width of the player window;

detect, via the touchscreen, a press and hold gesture;

receive a subsequent input via the touchscreen in connection with detecting the press and hold gesture;

cause a particular time in the video content to be presented based on the subsequent input and the detection of the press and hold gesture, wherein the press and hold gesture is detected at a first point along the width of the player window and wherein the subsequent input includes at least a movement of the press and hold gesture to a second point along the width of the player window without being released;

map times within the video content to the width of the player window, wherein times before and after the press and hold gesture was detected are mapped at different scales based on the first point of the press and hold gesture, wherein the portion of the player window that is to the right of the first point of contact are mapped to points in the video content that are forward in time from a current time at a first scale based on the first point in comparison with a right side of the player window and the portion of the player window that is to the left of the first point of contact are mapped to points in the video content that are backward in time from the current time at a second scale based on the first point in comparison with a left side of the player window;

determine that the press and hold gesture has moved to the second point along the width of the player window without being released;

in response to determining that the press and hold gesture has moved to the second point, cause the particular time in the video content corresponding to the second point to be presented based on the mapping of video content to the width of the player window;

determine that the press and hold gesture has been released at the second point of the player window; and in response to determining that the press and hold gesture has been released at the second point, cause presentation of the video content to continue from the particular time.

9. The system of claim 8, wherein the hardware processor is further programmed to:

detect a first tap gesture via the touchscreen within the player window;

cause presentation of the video content to be paused and causing a size of a progress bar that indicates playback position to be increased from a first size to a second size in response to receiving the first tap gesture;

detect a second tap gesture via the touchscreen within the player window; and cause presentation of the video content to continue from a paused state in response to detecting the second tap gesture.

10. The system of claim 9, wherein the hardware processor is further programmed to:

map navigation speeds to different portions of the player window based on the first point, wherein points to the right of the first point along the width of the player window correspond to navigation forward through the video at a first plurality of speeds and points to the left of the first point along the width of the player window correspond to navigation backward through the video at a second plurality of speeds;

determine that the press and hold gesture has moved to a second point along the width of the player window without being released;

in response to determining that the press and hold gesture has moved to the second point, cause a navigation action to be performed in a particular direction through the video content at a particular speed based on the mapping of navigation speeds to the width of the player window and the location of the second point along the width of the player window;

determine that the press and hold gesture has been released; and in response to determining that the press and hold gesture has been released, cause presentation of the video content to continue from a third portion of the video that was navigated to at least in part based on the navigation action being performed.

11. The system of claim 8, wherein the hardware processor is further configured to:

detect a first swipe gesture via the touchscreen that at least begins within the player window, wherein the first swipe gesture is a swipe from left to right;

in response to detecting the first swipe gesture, cause presentation of the video content to skip forward to a later time in the video content, wherein the video content is skipped forwards by a predetermined time period;

detect a second swipe gesture via the touchscreen that at least begins within the player window, wherein the second swipe gesture is a swipe from right to left; and in response to detecting the second swipe gesture, cause presentation of the video content to skip backward to an earlier time in the video content, wherein the video content is skipped backwards by the predetermined time period.

12. The system of claim 9, wherein the hardware processor is further programmed to:

cause a plurality of thumbnails to be presented in response to detecting the press and hold gesture, wherein each of the plurality of thumbnails represents video data at a time in the video;

detect a third tap gesture via the touchscreen within the player window, wherein the third tap gesture corresponds to one of the plurality of thumbnails; and cause presentation of the video content to continue from a time in the video corresponding to the particular time in the video represented by the selected thumbnail in response to detecting the third tap gesture corresponding to the one of the plurality of thumbnails.

13. The system of claim 12, wherein the hardware processor is further programmed to:

detect a third swipe gesture via the touchscreen that at least begins within the player window during presentation of the plurality of thumbnails;

cause a second plurality of thumbnails to be presented in response to detecting the third swipe gesture, wherein each of the second plurality of thumbnails represents video data at a time in the video and wherein at least one of the second plurality thumbnails represents a time in the video data not represented by at any of the first plurality of thumbnails; and detect the third tap gesture via the touchscreen within the player window during presentation of the second plurality of thumbnails, wherein the third tap gesture corresponds to one of the second plurality of thumbnails.

14. The system of claim 8, wherein the player window occupies the full screen of the touchscreen.

15. A non-transitory computer readable medium containing computer executable instructions that, when executed by a processor, cause the processor to perform a method for controlling presentation of video presented on a mobile device, the method comprising:

causing video content to be presented in a player window of a screen of a touchscreen, wherein the player window has a length and a width and wherein times within the video content are mapped to the width of the player window;

detecting, via the touchscreen, a press and hold gesture;

receiving a subsequent input via the touchscreen in connection with detecting the press and hold gesture;

causing a particular time in the video content to be presented based on the subsequent input and the detection of the press and hold gesture, wherein the press and hold gesture is detected at a first point along the width of the player window and wherein the subsequent input includes at least a movement of the press and hold gesture to a second point along the width of the player window without being released;

mapping times within the video content to the width of the player window, wherein times before and after the press and hold gesture was detected are mapped at different scales based on the first point of the press and hold gesture, wherein the portion of the player window that is to the right of the first point of contact are mapped to points in the video content that are forward in time from a current time at a first scale based on the first point in comparison with a right side of the player window and the portion of the player window that is to the left of the first point of contact are mapped to points in the video content that are backward in time from the current time at a second scale based on the first point in comparison with a left side of the player window;

determining that the press and hold gesture has moved to the second point along the width of the player without being released;

in response to determining that the press and hold gesture has moved to the second point, causing the particular time in the video content corresponding to the second point to be presented based on the mapping of video content to the width of the player window;

determining that the press and hold gesture has been released at the second point of the player window; and in response to determining that the press and hold gesture has been released at the second point, causing presentation of the video content to continue from the particular time.

16. The non-transitory computer readable medium of claim 15, wherein the method further comprises:

detecting a first tap gesture via the touchscreen within the player window;

causing presentation of the video content to be paused and causing a size of a progress bar that indicates playback position to be increased from a first size to a second size in response to receiving the first tap gesture;

detecting a second tap gesture via the touchscreen within the player window; and causing presentation of the video content to continue from a paused state in response to detecting the second tap gesture.

17. The non-transitory computer readable medium of claim 16, the method further comprises:

mapping navigation speeds to different portions of the player window based on the first point, wherein points to the right of the first point along the width of the player window correspond to navigation forward through the video at a first plurality of speeds and points to the left of the first point along the width of the player window correspond to navigation backward through the video at a second plurality of speeds;

determining that the press and hold gesture has moved to a second point along the width of the player window without being released;

in response to determining that the press and hold gesture has moved to the second point, causing a navigation action to be performed in a particular direction through the video content at a particular speed based on the mapping of navigation speeds to the width of the player window and the location of the second point along the width of the player window;

determining that the press and hold gesture has been released; and in response to determining that the press and hold gesture has been released, causing presentation of the video content to continue from a third portion of the video that was navigated to at least in part based on the navigation action being performed.

18. The non-transitory computer readable medium of claim 16, the method further comprises:

causing a plurality of thumbnails to be presented in response to detecting the press and hold gesture, wherein each of the plurality of thumbnails represents video data at a time in the video;

detecting a third tap gesture via the touchscreen within the player window, wherein the third tap gesture corresponds to one of the plurality of thumbnails; and causing presentation of the video content to continue from a time in the video corresponding to the particular time in the video represented by the selected thumbnail in response to detecting the third tap gesture corresponding to the one of the plurality of thumbnails.

19. The non-transitory computer readable medium of claim 18, wherein the method further comprises:

detecting a third swipe gesture via the touchscreen that at least begins within the player window during presentation of the plurality of thumbnails;

causing a second plurality of thumbnails to be presented in response to detecting the third swipe gesture, wherein each of the second plurality of thumbnails represents video data at a time in the video and wherein at least one of the second plurality thumbnails represents a time in the video data not represented by at any of the first plurality of thumbnails; and detecting the third tap gesture via the touchscreen within the player window during presentation of the second plurality of thumbnails, wherein the third tap gesture corresponds to one of the second plurality of thumbnails.

20. The non-transitory computer readable medium of claim 15, the method further comprises:

detecting a first swipe gesture via the touchscreen that at least begins within the player window, wherein the first swipe gesture is a swipe from left to right;

in response to detecting the first swipe gesture, causing presentation of the video content to skip forward to a later time in the video content, wherein the video content is skipped forwards by a predetermined time period;

detecting a second swipe gesture via the touchscreen that at least begins within the player window, wherein the second swipe gesture is a swipe from right to left; and in response to detecting the second swipe gesture, causing presentation of the video content to skip backward to an earlier time in the video content, wherein the video content is skipped backwards by the predetermined time period.

* * * * *